(12) United States Patent  
Oda

(10) Patent No.: US 7,787,040 B2  
(45) Date of Patent: Aug. 31, 2010

(54) SOLID-STATE IMAGE-TAKING ELEMENT AND IMAGE-TAKING APPARATUS INCLUDING THE SOLID-STATE IMAGE-TAKING ELEMENT

(75) Inventor: Kazuya Oda, Asaka (JP)

(73) Assignee: Fujifilm Corporation, Minato-ku, Tokyo (JP)

(*) Notice: Subject to any disclaimer, the term of this patent is extended or adjusted under 35 U.S.C. 154(b) by 0 days.

(21) Appl. No.: 12/314,228

(22) Filed: Dec. 5, 2008

(65) Prior Publication Data

US 2009/0096907 A1 Apr. 16, 2009

Related U.S. Application Data

(62) Division of application No. 10/874,389, filed on Jun. 24, 2004, now Pat. No. 7,480,000.

(30) Foreign Application Priority Data

Jun. 25, 2003 (JP) .............................. 2003-181214  
Jun. 25, 2003 (JP) .............................. 2003-181215

(51) Int. Cl.
*H04N 3/14* (2006.01)
*H04N 5/335* (2006.01)
*H04N 5/225* (2006.01)

(52) U.S. Cl. .................... 348/321; 348/220.1; 348/315; 348/316

(58) Field of Classification Search .............. 348/220.1, 348/229.1, 230.1, 315, 316, 319, 321, 322
See application file for complete search history.

(56) References Cited

U.S. PATENT DOCUMENTS 4,816,916 A 3/1989 Akiyama (Continued)

FOREIGN PATENT DOCUMENTS

JP 63-278364 11/1988

(Continued)

OTHER PUBLICATIONS

Notification of Reason for Refusal dated Jun. 23, 2008 with an English translation.

(Continued)

*Primary Examiner*—John M Villecco
(74) *Attorney, Agent, or Firm*—McGinn IP Law Group, PLLC

(57) ABSTRACT

An image-taking apparatus according to the present invention is constituted to have a wiring structure of transfer electrodes matching with a color filter arrangement and exert vertical transfer control over signal charges so as to transfer the signal charges read from pixels in the same color to the same horizontal transfer route. According to another embodiment of the present invention, the pixel of an image-taking device includes an odd-numbered electrode readout gate and an even-numbered electrode readout gate so that it allows control to read the charges to either of vertical transfer routes adjacent to the right and left of the pixel. It can be constituted so that one of the right and left vertical transfer routes transfers the charges to the first horizontal transfer route and the other transfers them to the second horizontal transfer route.

8 Claims, 22 Drawing Sheets

U.S. PATENT DOCUMENTS

| | | | |
|---|---|---|---|
| 4,924,316 | A | 5/1990 | Kobayashi et al. |
| 4,928,158 | A | 5/1990 | Kimata |
| 4,985,758 | A | 1/1991 | Hashimoto |
| 5,040,070 | A | 8/1991 | Higashitsutsumi et al. |
| 5,043,819 | A | 8/1991 | Cheon et al. |
| 5,148,013 | A | 9/1992 | Yamada |
| 5,528,291 | A | 6/1996 | Oda |
| 5,828,406 | A | 10/1998 | Parulski et al. |
| 6,002,146 | A | 12/1999 | Nakagawa et al. |
| 6,160,580 | A | 12/2000 | Nakashiba |
| 6,236,434 | B1 | 5/2001 | Yamada |
| 6,426,493 | B1 * | 7/2002 | Oda ............................ 348/322 |
| 6,690,418 | B1 | 2/2004 | Terasawa et al. |
| 6,784,928 | B1 | 8/2004 | Sakurai et al. |
| 7,256,831 | B2 | 8/2007 | Iizuka |
| 7,289,150 | B2 | 10/2007 | Harada |
| 7,602,431 | B2 * | 10/2009 | Takayama et al. ............ 348/315 |

FOREIGN PATENT DOCUMENTS

| | | | |
|---|---|---|---|
| JP | 02-53386 | | 2/1990 |
| JP | 04-134982 | | 5/1992 |
| JP | 05-095515 | | 4/1993 |
| JP | 08-125158 | | 5/1996 |
| JP | 10-136391 | | 5/1998 |
| JP | 64-4183 | | 1/1999 |
| JP | 2001078210 | A * | 3/2001 |
| JP | 2002-247452 | | 8/2002 |
| JP | 2003-052048 | | 2/2003 |
| JP | 2003-110099 | | 4/2003 |
| JP | 2003-143482 | | 5/2003 |
| JP | 2003-303951 | | 10/2003 |
| JP | 2004-007471 | | 1/2004 |
| JP | 2008112814 | A * | 5/2008 |

OTHER PUBLICATIONS

Notification of Reason for Refusal dated Apr. 9, 2008 with an English translation.

* cited by examiner

REVERSE TRANSFER VCCD PULSE
- DOWNWARD TRANSFER

TRANSFER TO A HORIZONTAL TRANSFER ROUTE 1112 (DOWNWARD)

TRANSFER TO A HORIZONTAL TRANSFER ROUTE 1114 (UPWARD)

SOLID-STATE IMAGE-TAKING ELEMENT AND IMAGE-TAKING APPARATUS INCLUDING THE SOLID-STATE IMAGE-TAKING ELEMENT

RELATED APPLICATIONS

The present Application is a Divisional Application of U.S. patent application Ser. No. 10/874,389 which was filed on Jun. 24, 2004 now U.S. Pat. No. 7,480,000.

BACKGROUND OF THE INVENTION

1. Field of the Invention

The present invention relates to an image-taking apparatus and a solid-state image-taking element, and in particular, to a technology for transfer control of signal charges stored in a photoelectric conversion element.

2. Description of the Related Art

In recent years, a CCD (Charge-Coupled Device) used for an image-taking device of a digital camera or a digital video camera is required to read and process a signal obtained from the CCD at high speed in conjunction with an increase in effective sensor resolution and a demand for high resolution. Density growth and sped-up processing of the CCD render a drive frequency thereof higher, and complexity of the CCD's structure increases wiring impedance. Consequently, various problems are arising, such as increase in unnecessary radiation, deterioration of an S/N ratio and increase in power consumption. As for moving image shooting, a readout speed of the CCD influences continuity of shot images so that various inventions are made in order to increase readout speed of the CCD.

FIG. 22 shows an example of a solid-state image-taking device in the past. FIG. 22 is a plan view showing a structure of a light receiving surface of a CCD 212. Pixels 102 are placed like a queue in a light receiving area 100 of the CCD 212. A vertical sequence is a row, a horizontal sequence is a line, and they are row 1, row 2 ... from the right and line 1, line 2 ... from the top.

The pixels 102 have a honeycomb structure in which central points of geometrical forms of the pixels are arranged by being alternately displaced by a half of a pixel pitch (½ pitch) in a line direction and in a row direction. To be more specific, it is the structure in which, between mutually adjacent lines (or rows) of the pixels 102, a pixel arrangement in the one line (or row) is placed to be relatively displaced by approximately a half of arrangement spacing in the line direction (or in the row direction) against the pixel arrangement in the other line (or row).

Between pixel rows, a vertical transfer route 104 for reading charges stored in the pixels is placed close to each pixel row as if snaking its way. The vertical transfer route 104 has a transfer electrode 105 for having a vertical transfer drive pulse signal (VCCD pulse) applied connected thereto. The transfer electrode 105 is shown in a frame of the vertical transfer route 104.

The light receiving area 100 has a VCCD drive circuit 110 for applying the VCCD pulse to the transfer electrode 105 placed on the right thereof.

Furthermore, the light receiving area 100 has a horizontal transfer route (HCCD) 112 for horizontally transferring signal charges moved from the vertical transfer route 104 placed on the downside thereof (final downside stage of the vertical transfer route 104). And the light receiving area 100 has a horizontal transfer route 114 for horizontally transferring the signal charges moved from the vertical transfer route 104 on the upside thereof (final upside stage of the vertical transfer route 104).

The horizontal transfer route 112 and the horizontal transfer route 114 are transfer-controlled by a two-phase driving pulse, and the charges are transferred from the right to the left in FIG. 22. The final stages thereof (leftmost stage in FIG. 22) are connected to an output portion 62 and an output portion 64 respectively.

The output portion 62 and the output portion 64 include an output amplifier (floating diffusion amplifier) which detects the charges of inputted signal charges and outputs them as signal voltage to an output terminal. Thus, signals photoelectrically converted by the pixels 102 are outputted as a dot sequential signal row.

To be more specific, if light gets incident on the pixels 102, the charges according to a light volume thereof are stored in photo-diodes of the pixels 102. And the charges stored in the pixels 102 are read to the vertical transfer route 104 corresponding to each pixel according to a field shift pulse.

On the vertical transfer route 104, the charges read from the pixels 102 are sequentially transferred to the horizontal transfer route 112 or the horizontal transfer route 114 by the VCCD pulse. Details of vertical transfer control over the charges will be described later.

If the charge per pixel line is transferred to a lowermost or an uppermost stage (a portion connected to the horizontal transfer route) of the vertical transfer route 104, the charge is read from the vertical transfer route 104 to the horizontal transfer route 112 or the horizontal transfer route 114 according to a transfer gate pulse.

According to the above-mentioned structure, the charge stored in each pixel is read to the vertical transfer route 104 placed on the right side thereof. To be more specific, a stored charge is read to a vertical transfer route 104A in a first row (odd-numbered row) as to the pixel row in the first row, and the stored charge is read to a vertical transfer route 104B in a second row (even-numbered row) as to the pixel row in the second row.

The vertical transfer route 104A transfers the charges to the horizontal transfer route 112. As for the vertical transfer route 104B, if a forward VCCD pulse for transferring the charges to the horizontal transfer route 114 is applied, the charges of the pixels corresponding to G and R (pixels in the odd-numbered rows) are transferred to the horizontal transfer route 112 so that image-taking signals corresponding thereto are outputted from the output portion 62. And the charges of the pixels corresponding to G and B (pixels in the even-numbered rows) are transferred to the horizontal transfer route 114 so that the image-taking signals corresponding thereto are outputted from the output portion 64.

The vertical transfer route 104A transfers the charges to the horizontal transfer route 114. As for the vertical transfer route 104B, if a reverse transfer VCCD pulse for transferring the charges to the horizontal transfer route 112 is applied, the charges of the pixels corresponding to G and R (pixels in the odd-numbered rows) are transferred to the horizontal transfer route 114 so that the image-taking signals corresponding thereto are outputted from the output portion 64. And the charges of the pixels corresponding to G and B (pixels in the even-numbered rows) are transferred to the horizontal transfer route 112 so that the image-taking signals corresponding thereto are outputted from the output portion 62.

As for the solid-state image-taking device disclosed in Japanese Patent Application Publication No. 8-125158, a proposal is made as to a method of placing the horizontal transfer routes above and below an image-taking area, cross-wiring a wiring electrode of the vertical transfer route for transferring the charges from the photo-diodes to the horizontal transfer route, and controlling the vertical transfer direction row by row by using a common driving pulse. For instance, it is possible, by the transfer control, to read the charges to a downward vertical transfer route in the case of the odd-numbered rows and read them to an upward vertical transfer route in the case of the even-numbered rows.

SUMMARY OF THE INVENTION

It is possible, by providing two horizontal transfer routes and correspondingly providing two CCD output circuits, to read an output from the CCD at high speed. However, there are the cases where variations in the CCD output circuits influence a generated image because no consideration is given to color filter arrangement and so on.

In a CCD 212 shown in FIG. 22, the same color information is transferred from each horizontal transfer route to the output portion 62 and the output portion 64, and has its voltage converted from floating diffusion amplifiers (FDAs) provided to the output portion 62 and the output portion 64 so as to be outputted. A Gain of the FDA is apt to have a problem such as variations appearing as uneven sensitivity.

If two CCD output circuits are provided, not only two systems of signal processing circuits for processing image-taking signals outputted from the CCD are required but control inside the CCD becomes complicated. If the two systems of the signal processing circuits are provided, not only miniaturization of the image-taking apparatus and reduction in power consumption are held back but the power consumption of the CCD and the entire image-taking apparatus may increase.

As for the solid-state image-taking device disclosed in Japanese Patent Application Publication No. 8-125158, a structure of vertical transfer routes for transferring charges to upper and lower horizontal transfer routes is complicated, and a signal processing system from the CCD output circuits onward is not disclosed in particular.

The present invention has been implemented in view of such circumstances, and an object thereof is to provide the image-taking apparatus capable of implementing vertical transfer control considering a color filter arrangement with an image-taking device comprising two horizontal transfer routes and two signal outputs and speeding up readout of the image-taking signals.

Another object of the present invention is to provide the solid-state image-taking device and the image-taking apparatus capable of simplifying the signal processing system in the form of the solid-state image-taking device for implementing signal charge transfer control according to a shooting mode and other control by means of simple control and the image-taking apparatus using it.

To attain the objects, the image-taking apparatus according to the present invention, comprising: a plurality of photoelectric conversion elements two-dimensionally arranged; color filter arrays having color filters in a plurality of colors two-dimensionally arranged correspondingly to each photoelectric conversion element; a first vertical transfer route, provided between rows of the photoelectric conversion elements arranged in a row direction, for transferring signal charges stored on an adjacent photoelectric conversion element in a vertical direction along the row direction, and a second vertical transfer route for transferring the signal charges in a reverse direction to the first vertical transfer route; a first horizontal transfer route, connected to final downside stages of the first and second vertical transfer routes, for transferring the signal charges sent from one of the first and second vertical transfer routes in a horizontal direction along the line direction of the arrangement; a second horizontal transfer route, connected to final upside stages of the first and second vertical transfer routes, for transferring the signal charges sent from the vertical transfer route other than the one for sending the signal charges to the first horizontal transfer route, in a horizontal direction along the line direction;

a first signal output device which converts the signal charges horizontally transferred by the first horizontal transfer route to the image-taking signals and outputting converted image-taking signals;

a second signal output device which converts the signal charges horizontally transferred by the second horizontal transfer route to the image-taking signals and outputting converted image-taking signals; and a vertical transfer control device which controls the transfer of the signal charges on the first and second vertical transfer routes so as to transfer the signal charges corresponding to one of the plurality of colors color-separated by the color filters only to one of the first and second horizontal transfer routes and transfer the signal charges corresponding to the other color only to the other horizontal transfer route.

According to the present invention, control is exerted so that the signal charges corresponding to the same color are transferred only to the same horizontal transfer route. As it does not send the image-taking signals corresponding to the same color to both the horizontal transfer routes, it is not necessary to consider variations in output characteristics (gain, temperature characteristics and so on) of a first output device connected to the first horizontal transfer route and a second output device connected to the second horizontal transfer route. To be more specific, the same color is read to the vertical transfer route of the same kind (transfer route for transfer in the same vertical transfer direction) and sent to the same horizontal transfer route so as not to have the signal charges in the same color dispersedly transferred to the first and second horizontal transfer routes.

The signal charges are vertically dispersed according to the color so that the same color can be obtained only from one of the signal output devices.

For instance, in the case where the color filter array is comprised of three colors, the signal charges are divided into one color and two colors and transferred to the first and second horizontal transfer routes.

One form of the present invention is the one wherein the first and second vertical transfer routes adjacent in the row direction have a wiring structure for crossing wirings of vertically adjacent electrodes so as to partially replace arrangement order of vertical transfer electrodes arranged in the row direction on the transfer routes respectively.

It is possible, because of this structure, to transfer-control the first and second vertical transfer routes simultaneously in reverse directions with a common vertical transfer control signal.

If vertical transfer control is performed by using the common vertical transfer control signal, the charges are transferred either upward or downward on all the vertical transfer routes in the wirings to which the vertical transfer electrodes of the same line sequence are connected. Of the wirings of the vertical transfer electrodes, the wiring at which adjacent two wirings are crossed has a transfer direction of the signal charges reversed on the vertical transfer routes in the vicinity of the crossing of the wirings. The form of crossing the wirings is corresponding to the vertical transfer control signal.

As for the form of replacing the two wirings, the wirings may be replaced for each vertical transfer route or for a plurality of vertical transfer routes. The wiring between the electrodes may be a conductive route generated by a semiconductor process or a connection with a wiring member.

As for the form of crossing the wirings of the electrodes alternately, the transfer directions of the vertical transfer routes are alternately switched. In the case of the form of crossing the wirings of the electrodes for every two vertical transfer routes or every three vertical transfer routes, it is possible to switch a signal charge transfer direction of the vertical transfer routes at every two rows or every three rows. The form of crossing the wirings of the electrodes is determined according to the arrangement of the color filter arrays.

Another form of the present invention is the one wherein the vertical transfer control device exerts reverse transfer control for transferring the signal charges in a reverse direction to the transfer direction of the signal charges by the vertical transfer control signal by using a reverse transfer vertical transfer control signal on the first and second vertical transfer routes.

According to this form, it is possible, by exerting control by switching between the vertical transfer control signal and the reverse transfer vertical transfer control signal, to transfer the signal charges read from the photoelectric conversion elements to either the first horizontal transfer route or the second horizontal transfer route.

The vertical transfer control signal and the reverse transfer vertical transfer control signal have a multiphase pulse signal applied thereto in general. There are various forms of the multiphase pulse signal such as two-phase driving, three-phase driving, four-phase driving and eight-phase driving, where any of the forms may be applied according to signal charge readout speed and other control. The vertical transfer control signal may have a form other than the aforementioned drive pulse applied thereto.

A further form of the present invention is the one wherein the color filter array has a row comprised of the color filters in one color and a row comprised of the color filters in colors other than the one color.

According to this form, if control is exerted to transfer the signal charges read from a pixel row corresponding to the row comprised of the color filters in one color and the signal charges read from the pixel row corresponding to the row comprised of the color filters in a color other than the one color to either the first or the second horizontal transfer route respectively, it is possible to read the signal charges from one of the signal output devices without causing the signal charges corresponding to the same color to be dispersed.

A still further form of the present invention is the one wherein it comprises: a gain setting device which sets amplification gains of the first and second signal output devices, and the vertical transfer control device transfers the signal charges corresponding to a color of relatively low sensitivity out of the colors constituting the color filter array to the horizontal transfer route connected to the output device of which output gain is set relatively high of the first and second signal output devices, and transfers the signal charges corresponding to a color of relatively high sensitivity out of the colors constituting the color filter array to the horizontal transfer route connected to the output device of which output gain is set relatively low.

This form allows the control wherein it transfers the signal charges corresponding to the color of relatively low sensitivity to the horizontal transfer route connected to the output device of which amplification gain is relatively high, and transfers the signal charges corresponding to the color of relatively high sensitivity to the horizontal transfer route connected to the output device of which amplification gain is relatively low. It allows a configuration to absorb sensitivity differences in the colors by the differences in the output gain and hold back the gain in a subsequent circuit. It is possible, by holding back the gain in the subsequent circuit, to curb increase in unnecessary radiation and deterioration of an S/N ratio.

It is sufficient, as for the gain setting device, to set the amplification gain of at least one of the first signal output device and the second signal output device.

A form of the present invention is the one wherein: the color filter arrays include a color filter array which has primary color filters arranged in a predetermined arrangement and also has at least a row having arranged the color filters corresponding to G and a row having alternately arranged the color filters corresponding to R and the color filters corresponding to B alternately placed therein; and the vertical transfer control device exerts control to transfer the signal charges of a photoelectric conversion element row corresponding to G to the horizontal transfer route connected to a signal output portion of which output gain is set relatively high out of the first and second signal output devices and transfer the signal charges of the photoelectric conversion element row corresponding to R and B to the horizontal transfer route connected to the signal output portion of which output gain is set relatively low out of the first and second signal output devices.

The pixels corresponding to G have higher sensitivity than the pixels corresponding to R and B. Therefore, the signal charges corresponding to G are transferred to the horizontal transfer route connected to the output device of which output gain is low, and the signal charges corresponding to R and B are transferred to the horizontal transfer route connected to the output device of which output gain is high.

Another form of the present invention is the one wherein: it comprises a color temperature information obtaining device which obtains color temperature information on a shooting scene; and the vertical transfer control device exerts control by switching between applying the vertical transfer control signal for performing a forward transfer based on the color temperature information obtained by the color temperature information obtaining device and applying the reverse transfer vertical transfer control signal for performing a reverse transfer.

There are the cases where a sensitivity ratio of the colors changes according to the color temperature on the shooting scene. It is possible, by exerting control by switching the vertical transfer direction of the signal charges based on the color temperature, to transfer the signal charges of a relatively high sensitivity ratio to the horizontal transfer route connected to the signal output device of which amplification gain is relatively low and transfer the signal charges of a relatively low sensitivity ratio to the horizontal transfer route connected to the signal output device of which amplification gain is relatively high.

A further form of the present invention is the one wherein the photoelectric conversion elements are arranged in an arrangement of a honeycomb structure in which central points of geometrical forms of the photoelectric conversion elements are arranged by being alternately displaced by a half of an arrangement pitch in the line direction and in the row direction.

According to this form, area of a portion between the photoelectric conversion elements is larger than that in the case of applying another arrangement such as a tetragonal arrangement, and so a larger wiring width can be taken.

Therefore, it is possible to prevent increase in wiring impedance and curb the occurrence of unnecessary radiation, deterioration of an S/N ratio and increase in power consumption. And in the case of applying a cross wiring to the wiring of the vertical transfer electrodes, the large wiring width is taken so that the wiring structure will not be complicated.

To attain the objects, the solid-state image-taking element according to the present invention, comprising: a plurality of photoelectric conversion elements two-dimensionally arranged; a first vertical transfer route for transferring signal charges stored on the photoelectric conversion elements vertically downward along the row direction of the arrangement; a second vertical transfer route for transferring the signal charges stored on the photoelectric conversion elements vertically upward along the row direction of the arrangement; a vertical transfer control device which controls a vertical transfer of the signal charges on the first and second vertical transfer routes with a vertical transfer control signal; a first horizontal transfer route, provided below the first vertical transfer route, for transferring the signal charges sent from the first vertical transfer route in a horizontal direction along the line direction of the arrangement; a second horizontal transfer route, provided above the second vertical transfer routes, for transferring the signal charges sent from the second vertical transfer route in the horizontal direction along the line direction of the arrangement, wherein the photoelectric conversion element comprises: a first readout gate for reading the signal charges to one of the adjacent first and second vertical transfer routes; a second readout gate for reading the signal charges to the vertical transfer route other than the one for reading the signal charges from the first readout gate; and a readout control device which controls whether to read the signal charges from the first readout gate or to read them from the second readout gate.

The present invention provides the two readout gates capable of reading the signal charges to the two vertical transfer routes adjacent to one photoelectric conversion element, and so it is possible read the signal charges to either of the two adjacent vertical transfer routes.

It is possible either to provide the two readout gates to all the photoelectric conversion elements or to provide the two readout gates only to the photoelectric conversion elements for exerting control to read the signal charges to the two adjacent vertical transfer routes.

It is possible either to change the transfer direction for each row of the photoelectric conversion elements or to change the transfer direction selectively from the photoelectric conversion elements.

A form of the present invention is the one wherein: the photoelectric conversion element row is alternately placed with the first and second vertical transfer routes, and one of the vertical transfer routes placed adjacently to the photoelectric conversion elements is the first vertical transfer route and the other is the second vertical transfer route, and the readout control device exerts control to read the signal charges from the first readout gate to one of the first and second vertical transfer routes and read the signal charges from the second readout gate to the vertical transfer route other than the one to which they are read via the first readout gate.

According to this form, it is possible either to read the charges stored on the photoelectric conversion elements to the first vertical transfer route and transfer them to the first horizontal transfer route or to read them to the second vertical transfer route and transfer them to the second horizontal transfer route.

It is also possible to read the signal charges to the same vertical transfer route on the photoelectric conversion elements adjacent in the line direction.

Another form of the present invention is the one comprising: a charge sending control electrode for controlling timing for sending the signal charges from each vertical transfer route to the first and second horizontal transfer routes in either a first connection portion connecting the first horizontal transfer route with the first vertical transfer route or a second connection portion connecting the second horizontal transfer route with the second vertical transfer route, and wherein: the vertical transfer control device uses the charge sending control electrode to control sending of the signal charges from the second vertical transfer route to the second horizontal transfer route in different timing from sending of the signal charges from the first vertical transfer route to the first horizontal transfer route.

The charge sending control electrode may be provided either to the first connection portion or to the second connection portion. And the charge sending control electrode may be provided only in one line or in a plurality of lines.

A further form of the present invention is the one comprising: a wiring device which has a structure for replacing adjacent two wirings out of the wirings of transfer electrodes to which the vertical transfer control signal is applied between the first and second vertical transfer routes, and wherein: the vertical transfer control device exerts control on the first vertical transfer route to transfer the signal charges to the first horizontal transfer route, and on the second vertical transfer route to transfer them to the second horizontal transfer route with a common vertical transfer control signal.

If the vertical transfer control is exerted by using the common vertical transfer control signal, the charges are transferred to either upward or downward on all the vertical transfer routes on the wirings connected with the vertical transfer electrodes of the same row sequence. Of the wirings of the vertical transfer electrodes, the cross wiring for having two adjacent wirings replaced has a transfer direction of the signal charges reversed on the vertical transfer routes in the vicinity of the replaced wirings. The form of the cross wiring is determined correspondingly to the vertical transfer control signal.

As for the form of replacing the two wirings, the wirings may be replaced for each vertical transfer route or for a plurality of vertical transfer routes. The wiring of the vertical transfer electrodes may be the conductive route generated by the semiconductor process or the connection with the wiring member.

The multiphase pulse signal is applied to the vertical transfer control signal in general. There are various forms of the multiphase pulse signal such as two-phase driving, three-phase driving, four-phase driving and eight-phase driving, where any of the forms may be applied according to signal charge readout speed and other control. The vertical transfer control signal may have a form other than the aforementioned drive pulse applied thereto.

A still further form of the present invention is the one wherein the photoelectric conversion elements are arranged in the arrangement of the honeycomb structure in which the central points of the geometrical forms of the photoelectric conversion elements are arranged by being alternately displaced by a half of the arrangement pitch in the line direction and in the row direction.

According to this form, if the arrangement of the honeycomb structure is applied to the arrangement of the photoelectric conversion elements, it is possible to take larger wiring space of the vertical transfer electrodes than that in the case of applying the tetragonal arrangement having the photoelectric conversion elements aligning in the row direction and in the line direction. And the wiring can be larger in the case of replacing the two wirings than that of the tetragonal arrangement. Therefore, it is possible to curb the unnecessary radiation, prevent the deterioration of the S/N ratio and hold back the increase in the power consumption without increasing the wiring impedance.

To attain the objects, the image-taking apparatus according to the present invention is the one wherein it comprises: the solid-state image-taking device comprising: a plurality of photoelectric conversion elements two-dimensionally arranged; the first vertical transfer route for transferring the signal charges stored on the photoelectric conversion elements vertically downward along the row direction of the arrangement; the second vertical transfer route for transferring the signal charges stored on the photoelectric conversion elements vertically upward along the row direction of the arrangement; the vertical transfer control device which controls the transfer of the signal charges on the first and second vertical transfer route; the first horizontal transfer route, provided below the first vertical transfer route, for transferring the signal charges sent from the first vertical transfer route in the horizontal direction along the line direction of the arrangement; the second horizontal transfer route, provided above the second vertical transfer route, for transferring the signal charges sent from the second vertical transfer route in the horizontal direction along the line direction of the arrangement; the first output portion for outputting as the image-taking signals the signal charges horizontally transferred on the first horizontal transfer route; and the second output portion for outputting as the image-taking signals the signal charges horizontally transferred on the second horizontal transfer route; and an output switching device which exerts control by switching between obtaining the image-taking signals from the first output portion and obtaining them from the second output portion.

According to the present invention, the solid-state image-taking element comprises the first and second horizontal transfer routes for horizontally transferring the signal charges stored on the photoelectric conversion elements, the first output device which outputs the signal charges transferred to the first horizontal transfer route as the image-taking signals and the second output device which outputs the signal charges transferred to the second horizontal transfer route as the image-taking signals, and the output switching device which selectively switches between obtaining the image-taking signals from the first output device and obtaining them from the second output device. Therefore, the signal processing system in the subsequent stage should have just one system against signal output of the two systems.

Either a CCD solid-state image-taking element or an MOS solid-state image-taking element may be applied to the solid-state image-taking element. A form in which a control system is provided to the solid-state image-taking element is also possible.

A form of the present invention is the one wherein, when shooting a moving image, the output switching device exerts control to obtain the image-taking signals from either the first output portion or the second output portion.

In moving image shooting which requires the signal charges to be obtained at high speed and in real time, processing time is about half in the case of obtaining the signal charges from one of the first and second horizontal transfer routes in comparison with the case of obtaining them from both the horizontal transfer routes.

In the case where a downside of an imaging area having the photoelectric conversion elements arranged thereon is equivalent to an upside of a subject, the form of obtaining the signal charges from the first horizontal transfer route is desirable because it is possible, by obtaining the signal charges from the first horizontal transfer route in the moving image shooting, to omit a process of switching the upside and downside when generating an image.

Another form of the present invention is the one wherein, when shooting a static image, the output switching device exerts control to transfer the signal charges to the first output portion and the second output portion.

When shooting the static image, priority is given to a charge amount (information amount) rather than to processing speed, and so control is exerted to obtain the signal charges from both the horizontal transfer routes.

The form of obtaining the signal charges from both the horizontal transfer routes may be the form of alternately obtaining the signal charges of one pixel line or alternately obtaining them at regular time intervals.

A further form of the present invention is the one wherein: it comprises color filter arrays including a color filter array having color filters corresponding to R, G and B arranged according to a predetermined arrangement and also having at least a row in which filters corresponding to G are placed along a row direction and a row in which elements corresponding to R and the elements corresponding to B are alternately placed along the row direction, where they are alternately placed along the line direction, and when shooting the static image, the vertical transfer control device exerts control to transfer the signal charges corresponding to a color G to one of the first and second horizontal transfer devices and transfer the signal charges corresponding to R and B to the horizontal transfer device other than the one to which the signal charges corresponding to the color G are transferred.

The signal charges corresponding to G are used for generation of a luminance signal and so on in signal processing, and so they are separated from the signals corresponding to R and B. As only the signals corresponding to G can be obtained from one of the two horizontal transfer routes, it is possible to omit the process of separating the signals corresponding to G from the signals corresponding to R and B.

The present invention is constituted to have the wiring structure of the vertical transfer electrodes matching with the color filter arrangement and exert the vertical transfer control over the signal charges so as to transfer the signal charges read from the pixels in the same color to the same horizontal transfer route. Therefore, it is not necessary to give consideration to reduce the variations in the output gain between the first and second output devices, and it is further possible to absorb the influence of the sensitivity ratio of each color by the output gains of the first and second output devices.

In the case where the sensitivity ratio of each color changes according to the color temperature, it is possible to exert control by switching the output devices which outputs the image-taking signals in each color according to the change of the color temperature.

According to the present invention, the readout gate connected to the two adjacent vertical transfer devices is provided to each photoelectric conversion element in the solid-state image-taking element having the horizontal transfer routes above and below the vertical transfer routes respectively and implementing high-speed readout of the signal charges. Therefore, it is possible to read the signal charges to any of the adjacent vertical transfer routes.

In the case where, of the vertical transfer routes adjacent to the photoelectric conversion elements, one is the first vertical transfer route for transferring the signal charges to the first horizontal transfer route and the other is the second vertical transfer route for transferring the charges to the second horizontal transfer route, the signal charges read from one of the two readout gates are transferred to the first horizontal transfer route and the signal charges read from the other of the two readout gates are transferred to the second horizontal transfer route. Therefore, the charges stored on the photoelectric conversion elements can be transferred to either the first or second horizontal transfer route.

Furthermore, the charge sending control electrode is provided so that it is possible to exert control not to simultaneously send the signal charges from each vertical transfer route to the first and second horizontal transfer routes.

If the wirings of the transfer electrodes are cross-wired between the two adjacent vertical transfer routes, it is possible, on the vertical transfer routes in the vicinity of the cross wiring, to exert control to transfer the signal charges to the first horizontal transfer device from one of them and transfer them to the second horizontal transfer device from the other with one vertical transfer control signal. Therefore, it is controllable, according to the shooting mode of the image-taking apparatus, whether to transfer the signal charges to the first horizontal transfer device or to the second horizontal transfer device.

If the photoelectric conversion elements are arranged according to the arrangement of the honeycomb structure, the area between the vertically and horizontally adjacent photoelectric conversion elements becomes larger than that in the case of another arrangement such as a tetragonal arrangement, and so the cross wiring of vertical transfer electrode using this area becomes easier and the wiring width does not become small. Therefore, the wiring impedance does not increase, and it is possible to curb the occurrence of unnecessary radiation, increase in power consumption and so on.

And the image-taking apparatus comprising the solid-state image-taking elements device has the signal output switching device which switches between obtaining the image-taking signals from the first signal output device which is an image-taking signal output of the first horizontal transfer device and obtaining them from the second signal output device which is the image-taking signal output of the second horizontal transfer device. Therefore, there should be just one signal processing system for performing the signal processing to the image-taking signals so that the signal processing system can be simplified.

As it has the configuration wherein the signal charges are transferred to the first horizontal transfer route when shooting the moving image and they are transferred to the first horizontal transfer device and the second horizontal transfer device when shooting the static image, the image-taking signals can be read at high speed in the moving image shooting which requires it to be real-time. And it is also possible, by reading the image-taking signals from the first output device, to omit the process of vertically inverting the screen.

When shooting the static image, priority is given to obtaining a large amount of information rather than to reading imaging at high speed, and so it is constituted to read the image-taking signals from the first and second signal output devices.

It comprises the color filter arrays in which a photoelectric conversion element row having the color filters corresponding to green placed therein, the color filters corresponding to red and the color filters corresponding to blue are alternately placed, and is able to transfer the signal charges to a different horizontal transfer device for each component color of the color filter, such as transferring the signal charges corresponding to red and those corresponding to blue to the first horizontal transfer device and transferring the signal charges corresponding to green to the second horizontal transfer device. It is possible to prevent occurrence of irregular colors and pattern noise on the image due to the different characteristics of the first and second output portions. Furthermore, the signals (charges) obtained from the elements corresponding to green are used to seek luminance information, and they are processed separately from the signals obtained from the elements corresponding to other colors, which is convenient for the signal processing.

DETAILED DESCRIPTION OF THE PREFERRED EMBODIMENTS

Hereafter, preferred embodiments of an image-taking apparatus and a solid-state image-taking device according to the present invention will be described according to the drawings.

Figure 1:
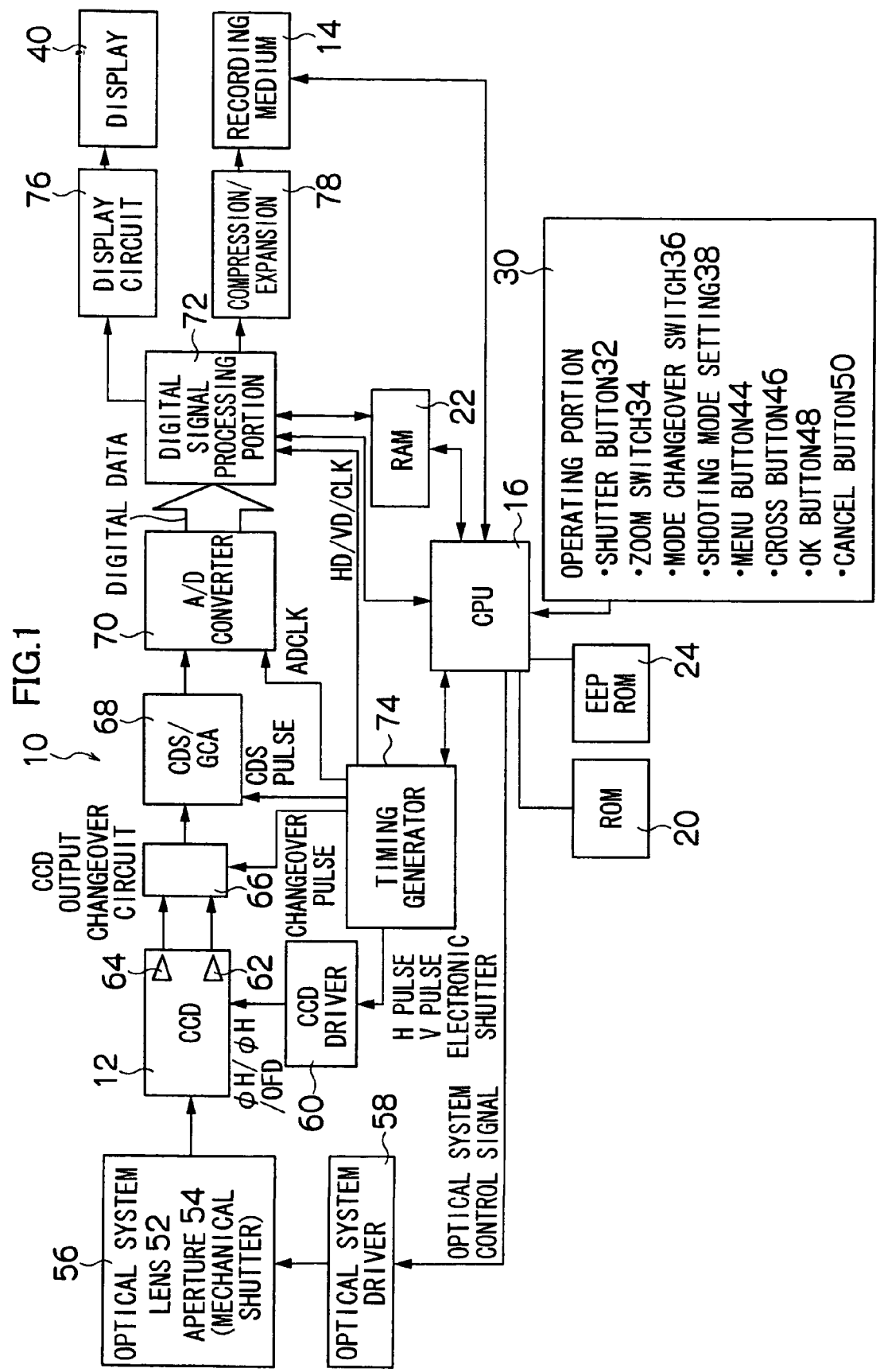
FIG. 1 is a block diagram of a camera according to an embodiment of the present invention.

FIG. 1 is a block diagram of a digital camera according to the embodiment of the present invention.

A camera 10 is the digital camera for converting an optical image of a subject taken via a CCD solid-state image-taking device (hereafter, described as a CCD) 12 to digital image data and recording it on a recording medium 14.

Operation of the entire camera 10 is integrated and controlled by a central processing unit (hereafter, described as a CPU) 16 built into the camera. The CPU 16 functions as a control device which controls this camera system according to a predetermined program, and also functions as a calculation device which performs various calculations such as an automatic exposure (AE) calculation, an automatic focusing (AF) calculation and auto white balance (AWB) control.

The CPU 16 is connected to a ROM 20 and a memory (RAM) 22 via a bus. The ROM 20 has a program executed by the CPU 16 and various kinds of data necessary for control stored therein. The RAM 22 is used as an expansion area for the programs and a calculation work area of the CPU 16, and is used as a temporary storage area of the image data.

The CPU 16 is also connected to an EEPROM 24. The EEPROM 24 is a nonvolatile storage device which stores data necessary to control the AE, AF, AWB and so on or information on customization set by a user, and is capable of rewriting the data as required and holding information contents even when the power is off. The CPU 16 performs the calculation and so on by referring to the data of the EEPROM 24 as required.

The camera 10 has an operating portion 30 for the user to input various instructions. The operating portion 30 includes various operating devices such as a shutter button 32, a zoom switch 34 and a mode changeover switch 36. The shutter button 32 is the operating device which inputs an instruction to start shooting, and is comprised of a double-stroke switch having an S1 switch to be turned on when half pushed and an S2 switch to be turned on when fully pushed. The AE and AF processes are performed by turning on the S1 switch, and exposure for recording is performed by turning on the S2 switch. The zoom switch 34 is the operating device which changes a shooting magnification and a reproducing magnification. The mode changeover switch 36 is the operating device which switches among a static image shooting mode, a moving image shooting mode and a reproduction mode.

In addition to the above, the operating portion 30 includes the operating devices such as a shooting mode setting device 38 which sets an optimum operation mode (a rapid shooting mode, an auto shooting mode, a manual shooting mode, a person mode, a scenery mode, a night view mode and so on) according to a shooting purpose, a menu button 44 for displaying a menu screen on a liquid crystal monitor (display) 40, a cross button (cursor operating device) 46 for selecting a desired item from the menu screen, an OK button 48 for providing an instruction to determine a selection item or execute a process, and a cancel button 50 for inputting the instruction to erase a desired subject such as the selection item, cancel instruction contents or return to an immediately preceding operating status.

The operating portion 30 is not limited to the one having a configuration such as a push switch member, a dial member or a lever switch but includes the one implemented by a user interface for selecting a desired item from the menu screen.

A signal from the operating portion 30 is inputted to the CPU 16. The CPU 16 controls each circuit of the camera 10 based on an input signal from the operating portion 30, and performs lens drive control, shooting operation control, image processing control, image data recording/reproducing control, display control of the liquid crystal monitor (display) 40 and so on for instance.

The liquid crystal monitor 40 can be used as an electronic finder for a field angle check on shooting, and is also used as the device which reproduces and displays a recorded image. The liquid crystal monitor 40 is also used as a display screen for the user interface, where the information such as menu information, selection items and setup contents is displayed as required. The liquid crystal monitor is used as the display according to this embodiment. However, it is also possible to use the display (display device) of another method such as organic EL.

Next, a shooting function of the camera 10 will be described.

An image-taking system of the camera 10 comprises an optical system 56 including a shooting lens 52 and an aperture mechanical shutter 54 and a CCD 12.

It is also possible to use the image-taking device of another method such as an MOS solid-state image-taking device instead of the CCD 12.

The shooting lens 52 is comprised of an electrically-operated zoom lens, and mainly includes a variable power lens group for mainly causing a magnification changing (focal length variable) action, a correcting lens group and a focus lens for contributing to focusing.

If the zoom switch 34 of the operating portion 30 is operated by a photographer, an optical system control signal is outputted to a lens driver (an optical system driver 58) from the CPU 16 according to that switch operation. The lens driver generates the signal for driving the lens based on the control signal from the CPU 16 and provides it to a zoom motor (not shown). Thus, the zoom motor is operated by a motor drive voltage outputted from the lens driver, and the variable power lens group and the correcting lens group in the shooting lens move to and fro along an optical axis so as to change the focal length (optical zoom magnification) of the shooting lens 52.

The CPU 16 controls the aperture mechanical shutter 54 via an aperture driver (an optical system driver 58). FIG. 1 shows the lens driver, the aperture driver and the optical system driver 58.

Light having passed through the optical system gets incident on a light receiving surface of the CCD 12. A large number of photo-sensors (light receiving elements) are flatly arranged on the light receiving surface of the CCD 12, where color filters in three primary colors of red (R), green (G) and blue (B) are placed in a predetermined array structure correspondingly to each photo-sensor. As a matter of course, the color filters in complementary colors comprised of cyan, magenta, yellow and (green) may also be used.

A subject image formed on the light receiving surface of the CCD 12 is converted to the signal charges of an amount according to an incident light volume by each photo-sensor. The CCD 12 has an electronic shutter function of controlling a charge storage time (shutter speed) of each photo-sensor according to timing of a shutter gate pulse.

The signal charges stored on each photo-sensor of the CCD 12 are sequentially read as voltage signals (image signals) according to the signal charges based on the drive pulse given from a CCD driver 60.

The CCD 12 comprises two horizontal transfer routes, and has an output portion 62 and an output portion 64 on the horizontal transfer routes respectively. Furthermore, it comprises a CCD output changeover circuit 66 for switching as to which output portion the image signals should be obtained from according to the shooting mode and readout control over the CCD 12, and the image signals obtained from each output portion are sent to a subsequent circuit via the CCD output changeover circuit 66. The control over the CCD 12 will be described later.

The CCD output changeover circuit 66 exerts control to alternately obtain the signals from the output portion 62 and the output portion 64 when shooting the static image and obtain them from either the output portion 62 or the output portion 64 without obtaining them from the other when shooting the moving image. As for the form of alternately obtaining the signals from the output portion 62 and the output portion 64 when shooting the static image, there are the form of switching the output at regular time intervals and the form of switching the output at every other pixel line or every plurality of pixel lines of the CCD 12.

This embodiment illustrated the form in which the image signals obtained from the output portion 62 and those obtained from the output portion 64 provided to the CCD 12 are switched by the CCD output changeover circuit 66 so as to provide one system of the subsequent circuits of the CCD 12. It is also possible, however, to apply the form of providing the processing systems to the output portion 62 and the output portion 64 respectively.

The image signals outputted from the CCD 12 are sent to an analog processing portion (CDS/GCA) 68. The analog processing portion 68 is a processing portion including a CDS (Correlated Double Sampling) circuit and a GCA (Gain Characteristic Adjustment) circuit. In the analog processing portion 68, they undergo a sampling process, a color separation process into R, G and B and adjustment of a signal level of each color signal.

The image signals outputted from the analog processing portion 68 are converted to digital signals by an A/D converter 70, and are then stored in the RAM 22 via a digital signal processing portion 72.

A timing generator (TG) 74 provides timing signals to the CCD driver 60, the CCD output changeover circuit 66, the analog processing portion 68, the A/D converter 70 and the digital signal processing portion 72 according to the instruction of the CPU 16, where the timing signals synchronize the circuits.

The digital signal processing portion 72 is a digital signal processing block doubling as a memory controller for controlling reading and writing of the RAM 22. The digital signal processing portion 72 is an image processing device including an auto calculation portion for performing the AE, AF and AWB processes, a white balance circuit, a gamma conversion circuit, synchronization circuit (a processing circuit for interpolating spatial displacements of the color signals in conjunction with a color filter arrangement of a single-panel CCD to calculate the color of each dot), a luminance/color difference signal luminance/color difference signal generation circuit, a profile correction circuit, a contrast correction circuit and so on, which processes the image signals while exploiting the RAM 22 according to a command from the CPU 16.

The data stored in the RAM 22 (CCDRAW data) is sent to the digital signal processing portion 72 via the bus. The image data inputted to the digital signal processing portion 72 undergoes predetermined signal processing such as white balance adjustment, gamma conversion and conversion (YC process) to a luminance signal (Y signal) and color difference signals (Cr, Cb signals), and is stored in the RAM 22 thereafter.

In the case of monitor-outputting a shot image, the image data is read from the RAM 22 and is sent to a display circuit 76. The image data sent to a display circuit 76 is converted to the signals for display of a predetermined method (color compound picture signal of an NTSC method for instance), and is then outputted to the liquid crystal monitor 40. The image data in the RAM 22 is periodically rewritten by the image signals outputted from the CCD 12, and the picture signals generated from the image data are supplied to the liquid crystal monitor 40 so that the image being taken (through image) is displayed on the liquid crystal monitor 40 in real time. The photographer can check the field angle (construct) with the image (so-called through movie) displayed on the liquid crystal monitor 40.

If the photographer determines the field angle and presses the shutter button 32, the CPU 16 detects it and performs the AE and AF processes in reaction to a half push of the shutter button (S1 ON) and performs CCD exposure and the readout control for the sake of capturing the image for recording in reaction to a full push of the shutter button (S2 ON).

To be more specific, the CPU 16 performs various calculations such as a focal evaluation calculation and an AE calculation from the image data captured in reaction to S1 ON, and sends the control signal to the lens driver based on the calculation results to control an AF motor not shown so as to move a focus lens (shown as the optical system in FIG. 1) to a focusing position.

As for the AE process, one screen of the shot image is divided into a plurality of areas (16×16 for instance), and RGB signals are added up for each divided area to provide an integrated value thereof to the CPU 16. The integrated value may be acquired as to each color signal of RGB or acquired as to only one color (G signal for instance) thereof.

The CPU 16 performs weighting addition based on the integrated value acquired by the AE process to detect brightness of the subject (subject luminance), and calculates an exposure value (shooting EV value) appropriate for the shooting.

The CPU 16 controls the aperture and the shutter speed based on the above-mentioned AE calculation results, and acquires the image for recording in reaction to a full push of the shutter button (S2 ON).

The image data captured in reaction to S2 ON undergoes the predetermined signal processing such as a YC process at the digital signal processing portion 72 shown in FIG. 1, and is compressed according to a predetermined compression format (JPEG method for instance) in a compression and expansion circuit 78. The compressed image data is recorded on the recording medium 14 via a media interface portion. A compression method is not limited to JPEG, but MPEG or another method may also be adopted.

As for the device which stores the image data, various media may be used, such as a semiconductor memory card represented by a smart medium xD-Picture Card (trademark) or Compact Flash (trademark), a magnetic dusk, an optical disk or a magnetic-optical disk. It is not limited to a removable medium but may also be the recording medium built into the camera 10 (internal memory).

In the AWB process, an average integrated value by the colors of the R, G and B signals is acquired from the R, G and B signals temporarily stored in the RAM 22 for each of a plurality of areas dividing one screen (8×8, 16×16 and so on). The average integrated value of the R, G and B signals for each divided area is calculated by an integration circuit (not shown), and is added to the CPU 16. A multiplier (not shown) is provided between the integration circuit and the CPU 16. The multiplier has an adjustment gain value added as to each color for adjusting variations in equipment.

The CPU 16 determines a light source type such as daylight (fine), a shade—cloudy, a fluorescent lamp or a tungsten bulb based on the average integrated values of the R, G and B signals for each of the above divided areas. As for this determination of the light source type, ratios R/G and B/G of the average integrated values by the colors of the R, G and B signals are acquired for each of the above divided areas, and then a detection frame for indicating ranges of color distribution corresponding to each light source type is set up on a graph of which horizontal axis is R/G and vertical axis is B/G. And the number of the areas to be in the detection frame is acquired based on the ratios R/G and B/G for each area so as to determine the light source type based on a luminance level of the subject and the number of the areas to be in the detection frame. The method of automatically acquiring the light source type (color temperature of the field) based on the R, G and B signals obtained from the CCD 12 is not limited to this embodiment.

The CPU 16 acquires the light source type (color temperature of the field) as described above, and then determines a white balance correction value appropriate for the light source type so as to output the determined white balance correction value (gain value) to the multiplier (not shown). Thus, the multiplier outputs white balance-adjusted R', G' and B' signals to the gamma conversion circuit.

In the case of emitting strobe light from a strobe apparatus not shown, the white balance correction value for implementing a good white balance to the strobe light is added to the white balance circuit.

The camera 10 comprises a moving image shooting function with voice. Image recording is started in response to the full push of the shutter button 32 (S2 ON), and it is stopped in response to the half push thereof (S1 ON). The voice is taken in from a microphone (not shown) and undergoes a predetermined process in a speech processing circuit (not shown) in the camera 10 so as to be recorded together with the image on the recording medium 14.

If the reproduction mode is selected by the mode changeover switch 36 of the operating portion 30, a final image file (lastly recorded file) recorded on the recording medium 14 is read. The data of the image file read from the recording medium 14 is expanded by the compression and expansion circuit 78, and is outputted to the liquid crystal monitor 40 via the display circuit 76.

It is possible, by operating the cross button 46 on one frame reproduction in the reproduction mode, to advance the frames forward or backward and have a file following the advanced frame is read from the recording medium 14 so as to update the display image.

Next, the control of the CCD 12 will be described in detail.

The CCD 12 is a single-panel color CCD used for color shooting. A double-panel CCD or a triple-panel CCD may also be applied to the CCD 12.

Figure 2:
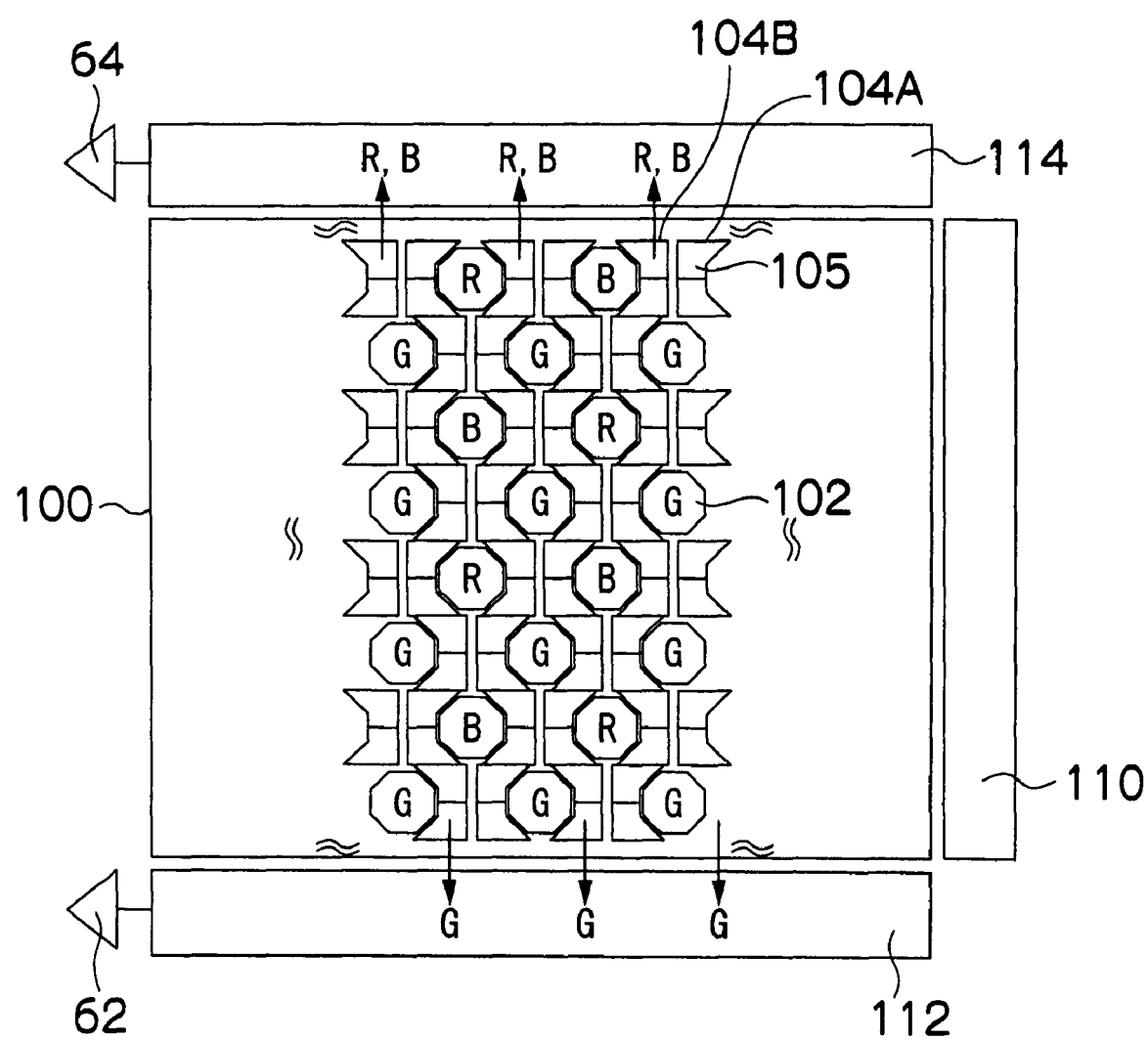
FIG. 2 is a plan view showing a structure of a CCD light receiving surface according to the embodiment of the present invention.
Figure 13:
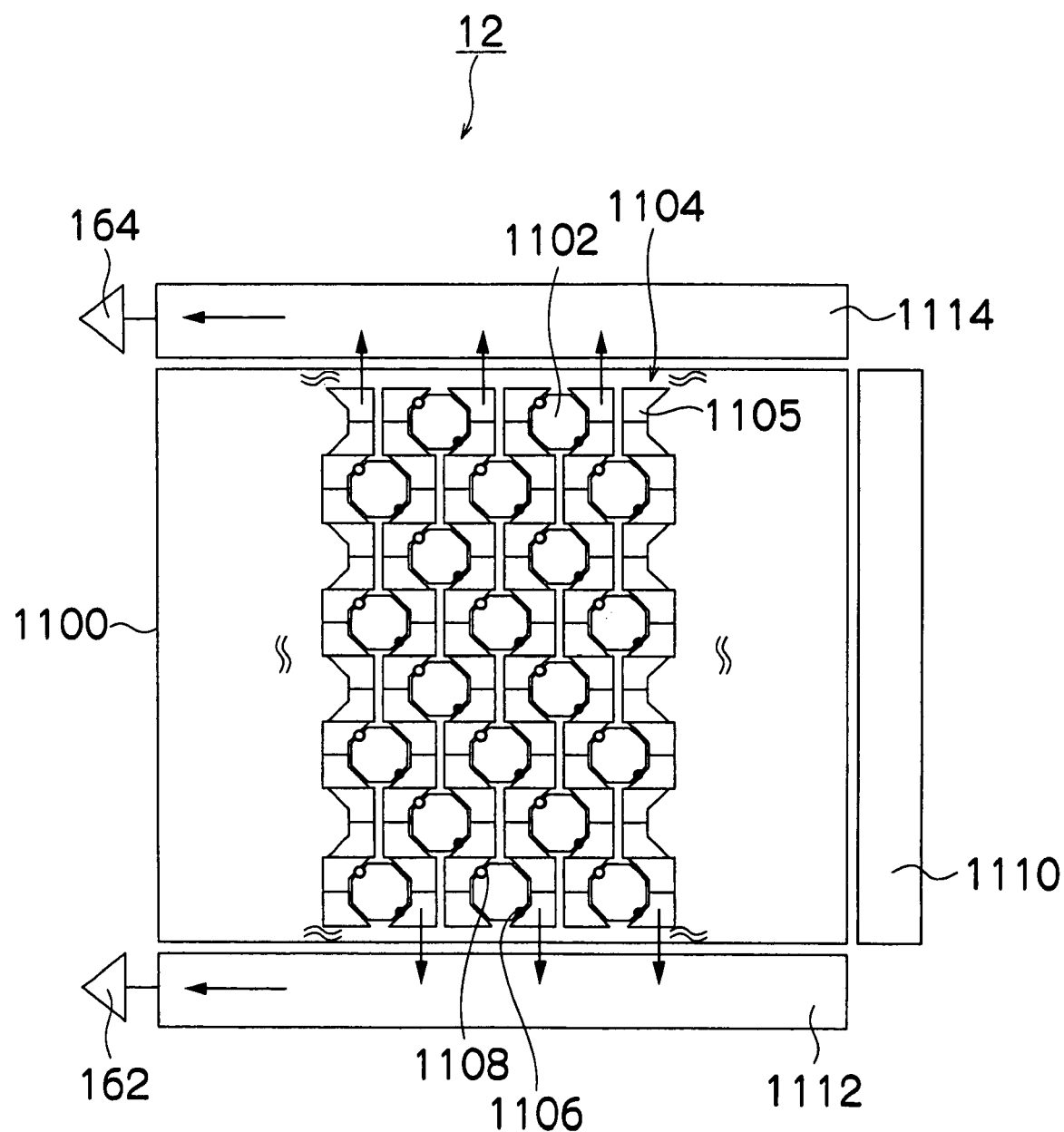
FIG. 13 is a plan view showing a CCD light receiving surface mounted on the camera according to the embodiment of the present invention.

FIG. 2 is a plan view showing a structure of the light receiving surface of the CCD 12. The portions in FIG. 2 which are the same as or similar to those in FIG. 13 are given the same symbols, and a description thereof will be omitted.

The CCD 12 comprises color filter arrays having the color filters in red, green and blue arranged in a predetermined arrangement. The R, G and B shown in a pixel 102 represent the color filters corresponding to red, green and blue respectively.

The color filter array shown in FIG. 2 is called a G vertical stripe RB checked arrangement, and has the structure in which a color filter row corresponding to green and a row having the color filters corresponding to red and those corresponding to blue alternately arranged therein are alternately placed.

Next, a description will be given as to vertical transfer control as well as the structure of the CCD 12 for transferring the signal charges to a horizontal transfer route 112 from a certain vertical transfer route and transferring them to a horizontal transfer route 114 from another vertical transfer route by using a common VCCD pulse.

First, a wiring structure of transfer electrodes 105 will be described by using FIGS. 3 and 4. The portions in FIGS. 3 and 4 which are the same as or similar to those in FIG. 2 are given the same symbols, and a description thereof will be omitted.

Figure 3:
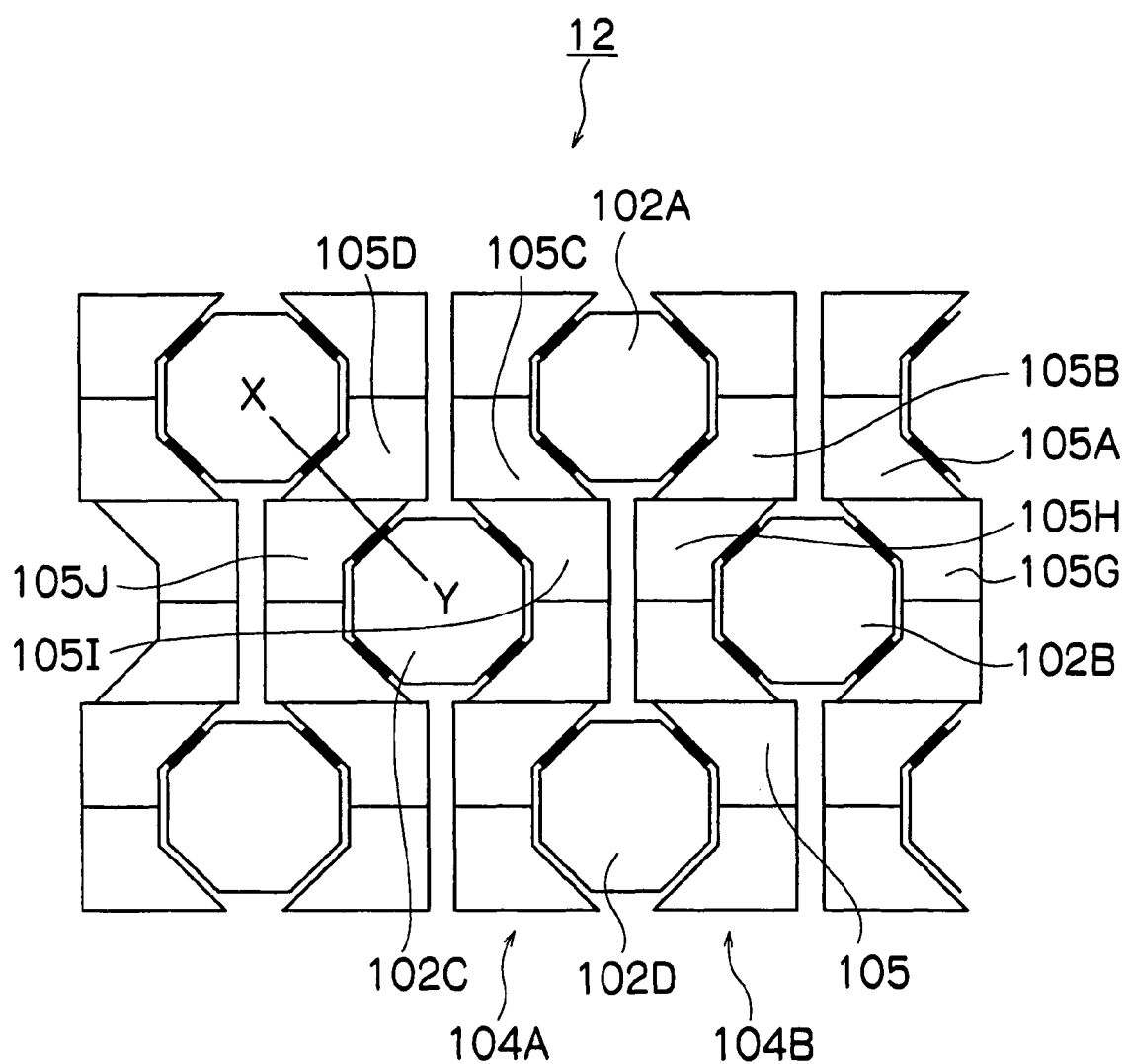
FIG. 3 is a diagram showing pixels, vertical transfer routes and transfer electrodes of a honeycomb arrangement.

In FIG. 3, the transfer electrodes 105 of the pixels 102 which are honeycomb-arranged are connected by a straight wiring. The pixels 102 have four transfer electrodes 105 adjacent to them respectively. And they are connected by a common wiring so that the transfer electrodes 105 in the same line (105A, 105B, 105C and 105D for instance) will have the signals of the same phase of the VCCD pulse applied thereto. To be more specific, 105A, 105B, 105C, 105D . . . have the signals of the same phase of the VCCD pulse applied thereto, and 105G, 105H, 105I, 105J . . . have the signals of the same phase of the VCCD pulse applied thereto.

If the above-mentioned straight wiring is applied and control is exerted by the common VCCD pulse, the signal charges are sent in the same direction from all the vertical transfer routes 104.

Figure 4:
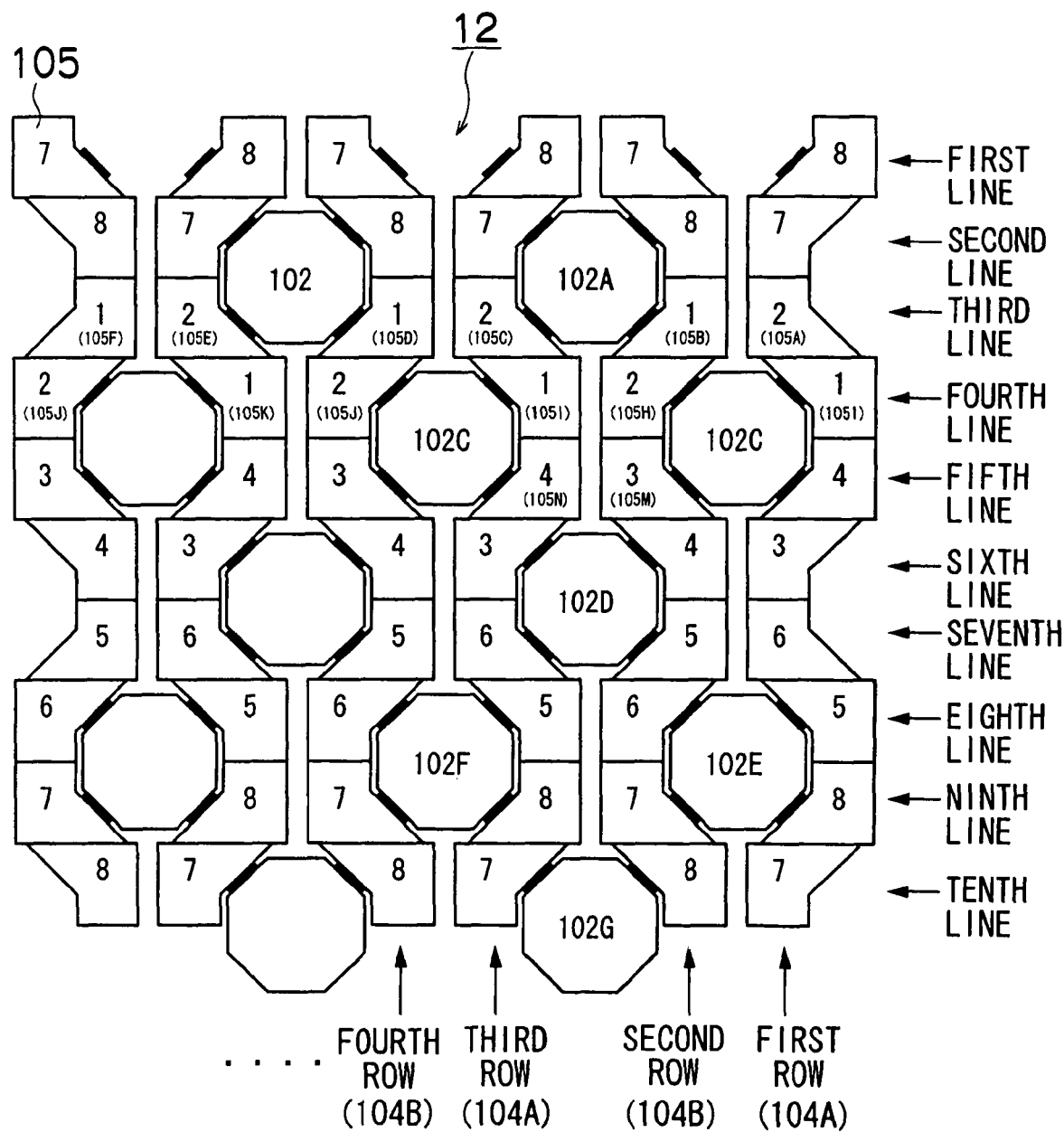
FIG. 4 is a diagram in which cross wiring is applied to wiring of the transfer electrodes.

FIG. 4 shows the form in which the transfer electrodes 105 are connected by the cross wiring.

Figure 5:
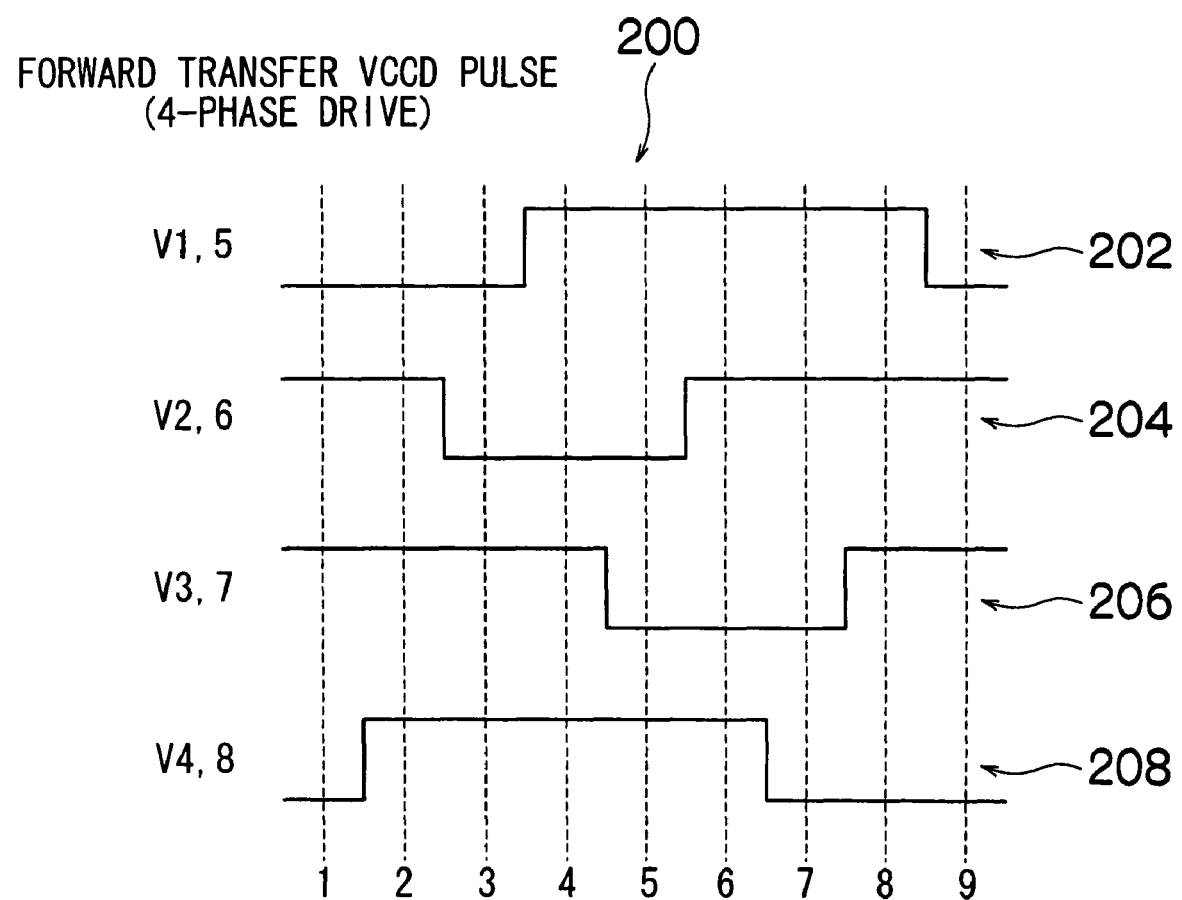
FIG. 5 is a diagram showing a forward transfer vertical transfer control drive pulse.

In FIG. 4, the transfer electrodes 105 of each vertical transfer route are numbered 1 to 8 which are equivalent to the numbers of the phases of a forward transfer VCCD pulse 200 (4-phase signal) shown in FIG. 5.

For instance, FIG. 4 shows that the transfer electrode 105 indicated as "1" has a first-phase signal (fifth-phase signal) 202 indicated at "V1 (V1, 5)" applied thereto. Likewise, the numbers indicated at the transfer electrodes 105 in FIG. 4 are corresponding to the phases of the VCCD pulse in FIG. 5.

As for the forward transfer VCCD pulse 200 shown in FIG. 5, driving signals of the same phase are applied to the first and fifth phases (reference numeral 202), second and sixth phases (reference numeral 204), third and seventh phases (reference numeral 206) and fourth and eighth phases (reference numeral 208). The forward transfer VCCD pulse 200 is a negative-logic pulse signal of which L level indicates effectiveness and H level indicates non-effectiveness.

If the transfer electrodes in the third line and the transfer electrodes in the fourth line in FIG. 4 are cross-wired, the wiring is performed at the transfer electrodes 105 to which the first-phase signals are applied in FIG. 5 so that 105G, 105B, 105I, 105D, 105K, 105F . . . are connected.

And the wiring is performed at the transfer electrodes 105 to which the second-phase signals are applied in FIG. 5 so that 105A, 105H, 105C 105J, 105E, 105L . . . are connected. To be more specific, the wirings in the third and fourth lines are replaced each time the wiring is performed in the adjacent row.

Likewise, the above-mentioned cross wiring is performed at the transfer electrodes 105 to which the third-phase signals are applied and the transfer electrodes 105 to which the fourth-phase signals are applied, the transfer electrodes 105 to which the fifth-phase signals are applied and the transfer electrodes 105 to which the sixth-phase signals are applied, and the transfer electrodes 105 to which the seventh-phase signals are applied and the transfer electrodes 105 to which the eighth-phase signals are applied.

In the case where the transfer electrodes 105 are wired by the above-mentioned cross wiring, it is possible, by applying the common VCCD pulse to the transfer electrodes, to transfer the signal charges in reverse directions between a vertical transfer route 104A in an odd-numbered row and a vertical transfer route 104B in an even-numbered row.

Figure 6:
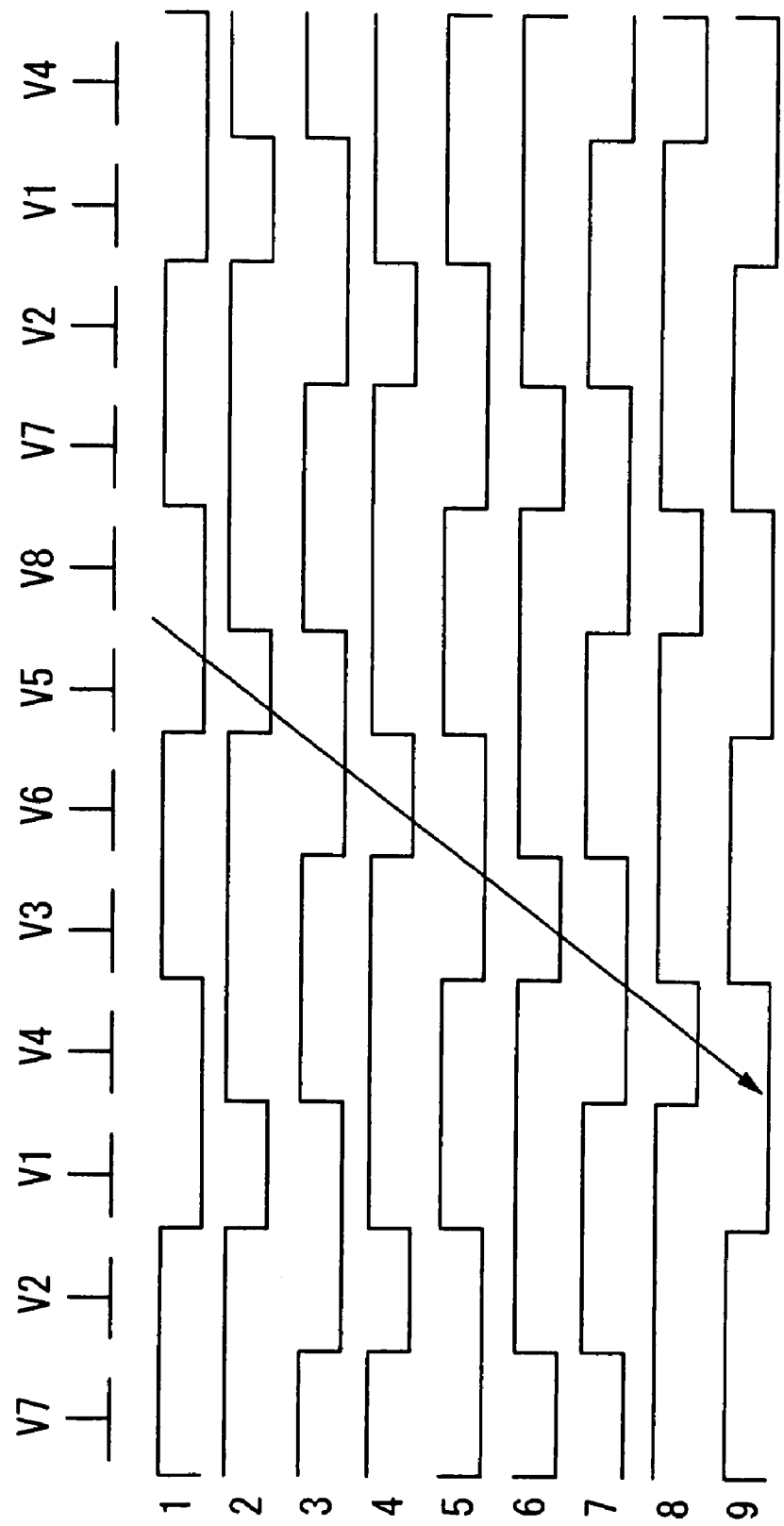
FIG. 6 is a transition diagram of signal charges transferred upward using the forward transfer vertical transfer control drive pulse.

FIG. 6 shows a transition diagram of signal charge transfer on the vertical transfer route 104A to which the forward transfer VCCD pulse is applied. In FIG. 6, a right direction indicates the direction of the horizontal transfer route 112, and a left direction indicates the direction of the horizontal transfer route 114.

In FIG. 6, reference characters V1 to V8 designate the electrodes to which the signals of the phases of the forward transfer VCCD pulse 200 in FIG. 5 are applied, where the order from the left in FIG. 6 corresponds to the order from the top on the vertical transfer route 104A in FIG. 4. To be more specific, they are arranged in order of V7, V2, V1, V4, V3, V6, V5, V8 . . . from the left in FIG. 6, and are arranged in order of 7, 2, 1, 4, 3, 6, 5, 8 . . . from the top on the vertical transfer route 104A in FIG. 4.

The numbers indicated at the left end of FIG. 6 denote a state of the forward transfer VCCD pulse 200 shown in FIG. 5 on a time-series axis, which corresponds to the state of the forward transfer VCCD pulse (horizontal system).

In FIG. 6, the L level indicates that the signal charges exist, and the H level indicates that no signal charge exists.

In a state 1 in FIG. 6, the signal charges exist at positions numbered 1, 4, 5 and 8 in FIG. 4. To be more specific, the signal charges are stored at the positions of the fourth, fifth, eighth and ninth lines on the vertical transfer route 104A.

In a state 2 in FIG. 6, the transfer electrodes 105 numbered 4 and 8 in FIG. 4 transit to the H level (non-effective). The positions numbered 4 and 8 are barriers of the charges, and the signal charges are stored at the positions numbered 1 and 5.

Next, in a state 3 in FIG. 6, the positions numbered 2 and 6 in FIG. 4 are at the L level, and the signal charges are shifted upward on the vertical transfer route 104A.

Thereafter, in a state 4 in FIG. 6, the transfer electrodes 105 numbered 1 and 5 in FIG. 4 transit to the H level. The positions numbered 1 and 5 are the barriers of the charges, and the signal charges are stored at the positions numbered 2 and 6.

If the state thus transits in order, the vertical transfer route 104A has the signal charges transferred in the direction of the horizontal transfer route 114 (upward).

Figure 7:
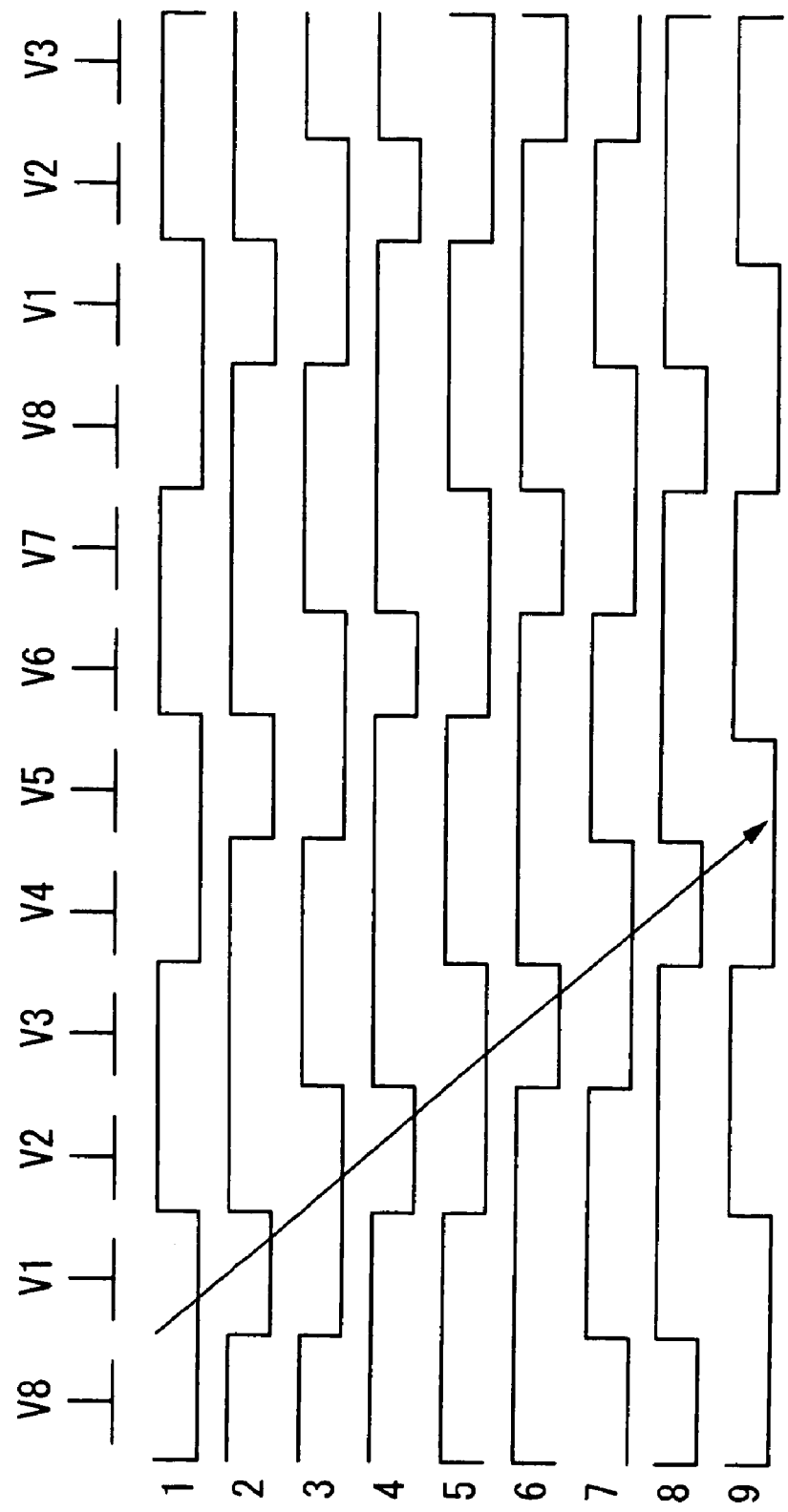
FIG. 7 is a transition diagram of the signal charges transferred downward using the forward transfer vertical transfer control drive pulse.

FIG. 7 shows a transition diagram of the signal charges transfer on the vertical transfer route 104B to which the forward transfer VCCD pulse is applied. The portions in FIG. 7 which are the same as or similar to those in FIG. 6 are given the same symbols, and a description thereof will be omitted.

In FIG. 7, reference characters V1 to V8 designate the electrodes to which the signals of the phases of the forward transfer VCCD pulse 200 in FIG. 5 are applied, where the order from the left in FIG. 7 corresponds to the order from the top on the vertical transfer route 104B in FIG. 4. To be more specific, they are arranged in order of V8, V1, V2, V3, V4, VS, V6, V7 . . . from the left in FIG. 7, and are arranged in order of 8, 1, 2, 3, 4, 5, 6, 7 . . . from the top on the vertical transfer route 104A in FIG. 4.

The numbers indicated at the left end of FIG. 7 denote the state of the forward transfer VCCD pulse 200 shown in FIG. 5 on the time-series axis, which corresponds to the state of the forward transfer VCCD pulse (horizontal system).

In the state 1 in FIG. 7, the signal charges exist at the positions numbered 1, 4, 5 and 8 in FIG. 4. To be more specific, the signal charges are stored at the positions of the second, third, sixth and seventh lines on the vertical transfer route 104B.

In the state 2 in FIG. 7, the transfer electrodes 105 numbered 4 and 8 in FIG. 4 transit to the H level (non-effective). The positions numbered 4 and 8 are the barriers of the charges, and the signal charges are stored at the positions numbered 1 and 5.

Next, in the state 3 in FIG. 7, the positions numbered 2 and 6 in FIG. 4 are at the L level, and the signal charges are shifted downward on the vertical transfer route 104B.

Thereafter, in the state 4 in FIG. 7, the transfer electrodes 105 numbered 1 and 5 in FIG. 4 transit to the H level. The positions numbered 1 and 5 are the barriers of the charges, and the signal charges are stored at the positions numbered 2 and 6.

If the state thus transits in order, the vertical transfer route 104B has the signal charges transferred in the direction of the horizontal transfer route 112 (downward).

If the above-mentioned wiring structure of the transfer electrodes 105 and the vertical transfer control of the signal charges by the forward transfer VCCD pulse are applied to the CCD 12, the signal charges corresponding to green (G charges) are sent to the horizontal transfer route 112 via the vertical transfer route 104A, and the signal charges corresponding to red and blue (R charges and B charges) are sent to the horizontal transfer route 114 via the vertical transfer route 104B.

Next, a description will be given as to the form of transferring the signal charges in a reverse direction to the above-mentioned vertical transfer control of the signal charges by using FIGS. 8 to 10. The portions in FIGS. 8 to 10 which are the same as or similar to those in FIGS. 5 to 7 are given the same symbols, and a description thereof will be omitted.

Figure 8:
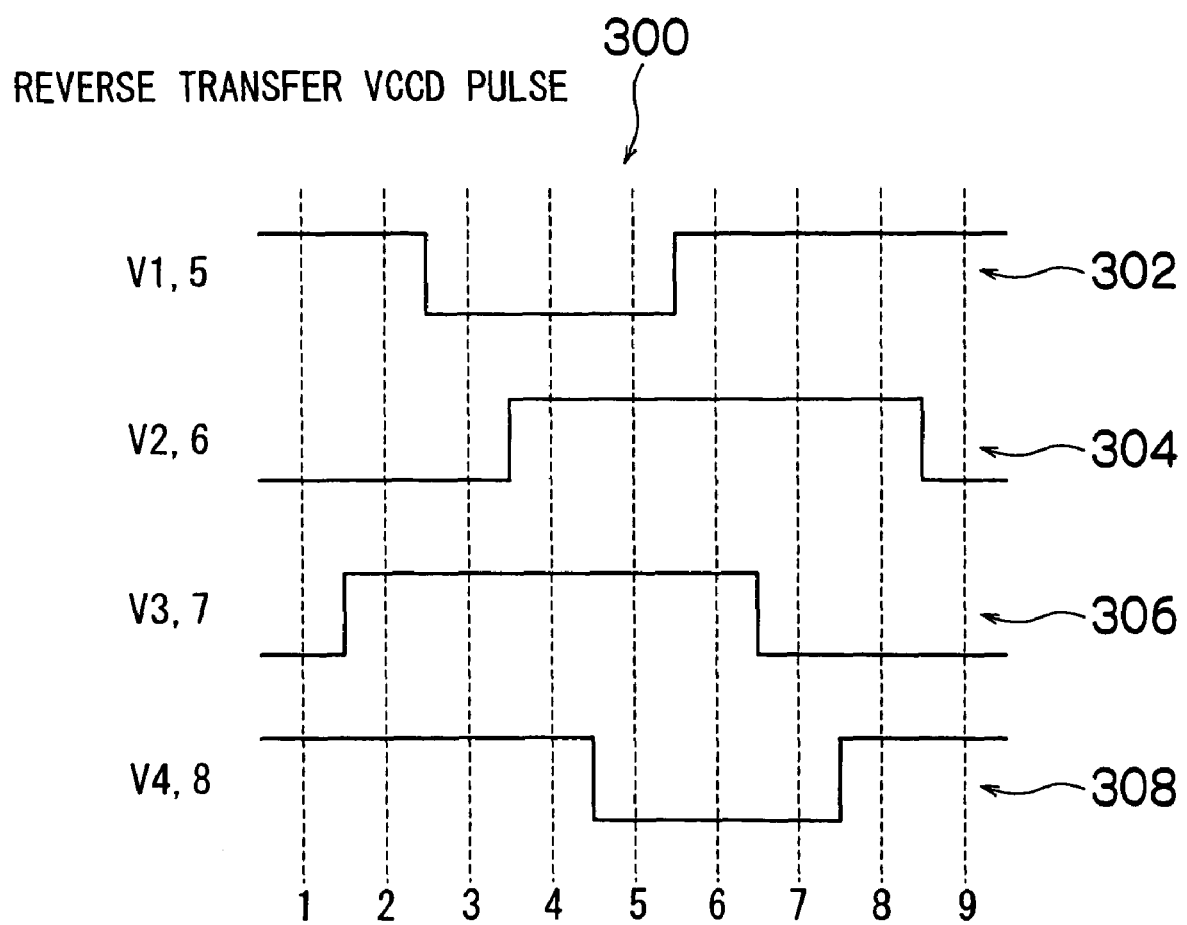
FIG. 8 is a diagram showing a reverse transfer vertical transfer control drive pulse.

FIG. 8 shows a reverse transfer VCCD pulse 300 applied to the VCCD pulse. As with the forward transfer VCCD pulse 200, the reverse transfer VCCD pulse 300 has the driving signals of the same phase applied to the first and fifth phases (reference numeral 302), second and sixth phases (reference numeral 304), third and seventh phases (reference numeral 306) and fourth and eighth phases (reference numeral 308). It is the negative-logic pulse signal of which L level indicates effectiveness and H level indicates non-effectiveness.

Figure 9:
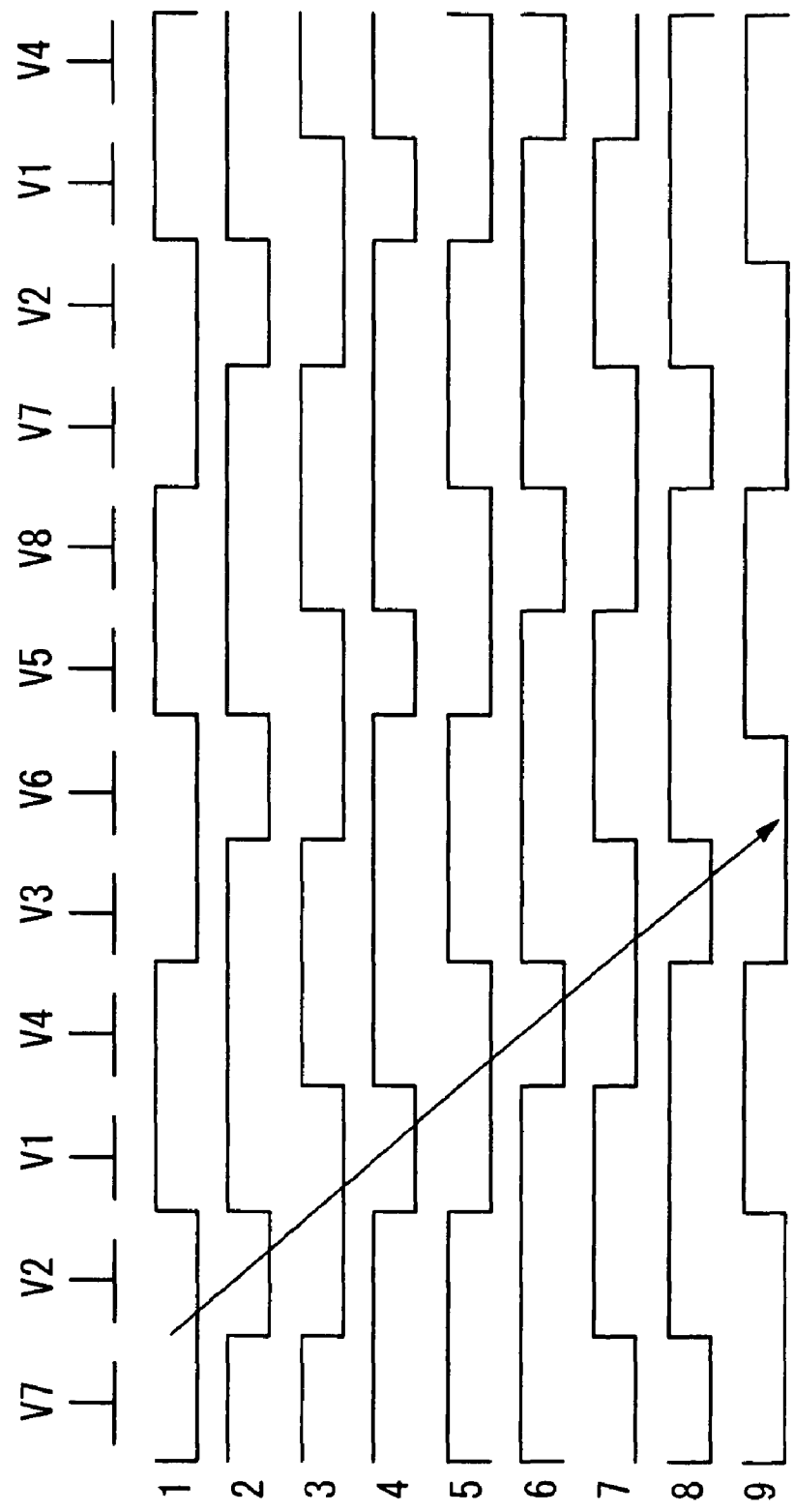
FIG. 9 is a transition diagram of the signal charges transferred upward using a reverse transfer vertical transfer control drive pulse.

FIG. 9 shows a transition diagram of the signal charge transfer on the vertical transfer route 104A in the case of applying the reverse transfer VCCD pulse 300.

In FIG. 9, reference characters V1 to V8 designate the electrodes to which the signals of the phases of the reverse transfer VCCD pulse 300 in FIG. 8 are applied, where the order from the left in FIG. 9 corresponds to the order from the top on the vertical transfer route 104A in FIG. 4. To be more specific, they are arranged in order of V7, V2, V1, V4, V3, V6, V5, V8 . . . from the left in FIG. 9, and are arranged in order of 7, 2, 1, 4, 3, 6,5, 8 . . . from the top on the vertical transfer route 104A in FIG. 4.

The numbers indicated at the left end of FIG. 9 denote the state of the reverse transfer VCCD pulse 300 shown in FIG. 8 on the time-series axis, which corresponds to the state of the reverse transfer VCCD pulse 300 (horizontal system).

In the state 1 in FIG. 9, the signal charges exist at the positions numbered 7, 2, 3 and 6 in FIG. 4. To be more specific, the signal charges are stored at the positions of the second, third, sixth and seventh lines on the vertical transfer route 104A.

In the state 2 in FIG. 9, the transfer electrodes 105 numbered 7 and 3 in FIG. 4 transit to the H level (non-effective). The positions numbered 7 and 3 are the barriers of the charges, and the signal charges are stored at the positions numbered 2 and 6.

Next, in the state 3 in FIG. 9, the positions numbered 1 and 5 in FIG. 4 are at the L level, and the signal charges are shifted downward on the vertical transfer route 104A.

Thereafter, in the state 4 in FIG. 9, the transfer electrodes 105 numbered 2 and 6 in FIG. 4 transit to the H level. The positions numbered 2 and 6 are the barriers of the charges, and the signal charges are stored at the positions numbered 1 and 5.

If the state thus transits in order, the vertical transfer route 104A has the signal charges transferred in the direction of the horizontal transfer route 112 (downward).

Figure 10:
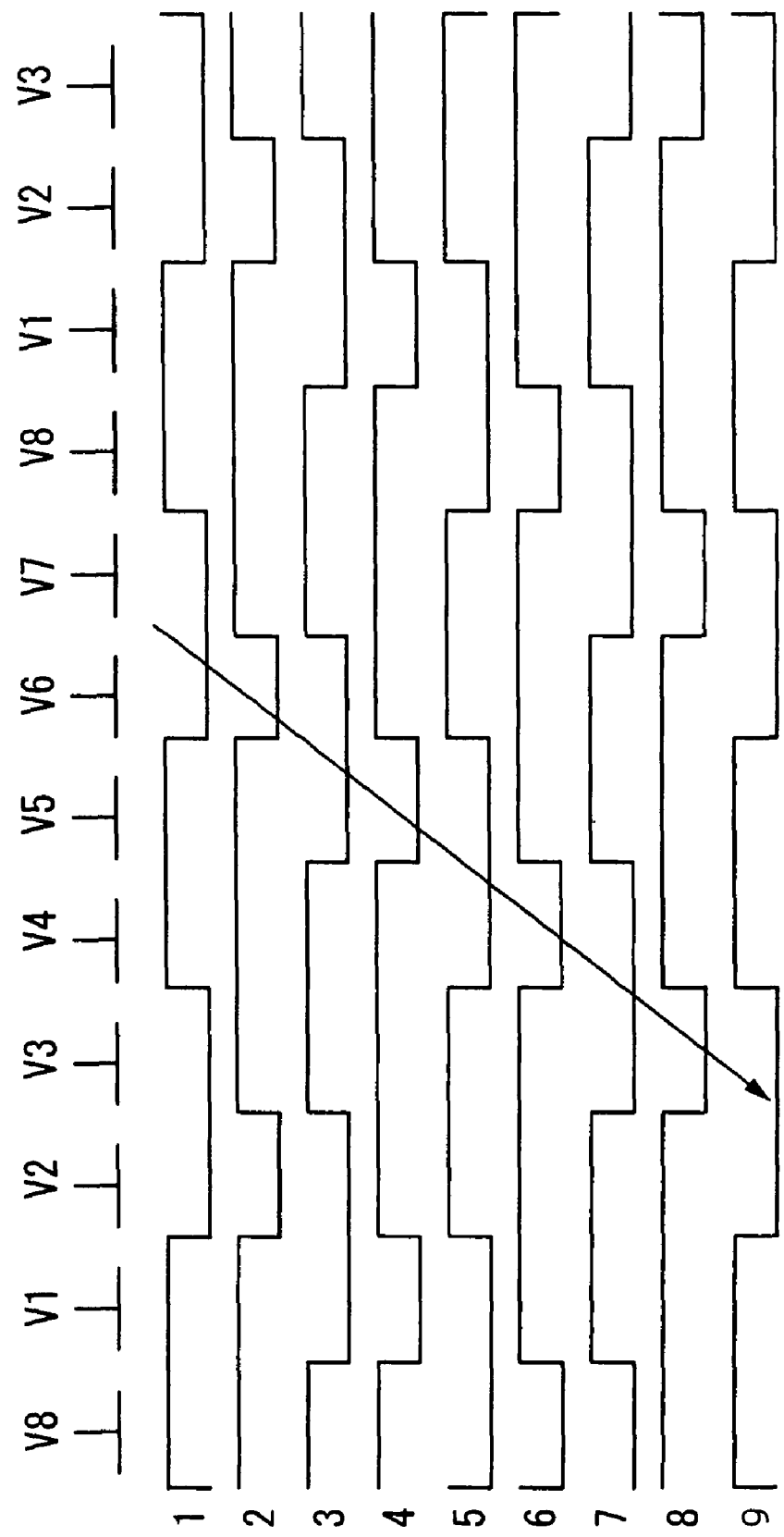
FIG. 10 is a transition diagram of the signal charges transferred downward using a reverse transfer vertical transfer control drive pulse.

FIG. 10 shows a transition diagram of the signal charge transfer on the vertical transfer route 104B in the case of applying the reverse transfer VCCD pulse 300.

In FIG. 10, reference characters V1 to V8 designate the electrodes to which the signals of the phases of the reverse transfer VCCD pulse 300 in FIG. 8 are applied, where the order from the left in FIG. 10 corresponds to the order from the top on the vertical transfer route 104B in FIG. 4. To be more specific, they are arranged in order of V8, V1, V2, V3, V4, V5, V6, V7 . . . from the left in FIG. 10, and are arranged in order of 8, 1, 2, 3, 4, 5, 6, 7 . . . from the top on the vertical transfer route 104B in FIG. 4.

In the state 1 in FIG. 10, the signal charges exist at the positions numbered 7, 2, 3 and 6 in FIG. 4. To be more specific, the signal charges are stored at the positions of the second, third, sixth and seventh lines on the vertical transfer route 104B.

In the state 2 in FIG. 10, the transfer electrodes 105 numbered 7 and 3 in FIG. 4 transit to the H level (non-effective). The positions numbered 7 and 3 are the barriers of the charges, and the signal charges are stored at the positions numbered 2 and 6.

Next, in the state 3 in FIG. 10, the positions numbered 1 and 5 in FIG. 4 are at the L level, and the signal charges are shifted upward on the vertical transfer route 104B.

Thereafter, in the state 4 in FIG. 10, the transfer electrodes 105 numbered 2 and 6 in FIG. 4 transit to the H level. The positions numbered 2 and 6 are the barriers of the charges, and the signal charges are stored at the positions numbered 1 and 5.

If the state thus transits in order, the vertical transfer route 104B has the signal charges transferred in the direction of the horizontal transfer route 114 (upward).

If the reverse transfer VCCD pulse 300 is applied to the VCCD pulse, control is exerted to transfer the R charges and B charges to the horizontal transfer route 112 and transfer the G charges to the horizontal transfer route 114.

This embodiment illustrated the form of crossing the wirings of the transfer electrodes 105 at every other row. However, it is also possible to do so at every third row or every fourth row.

Figure 11:
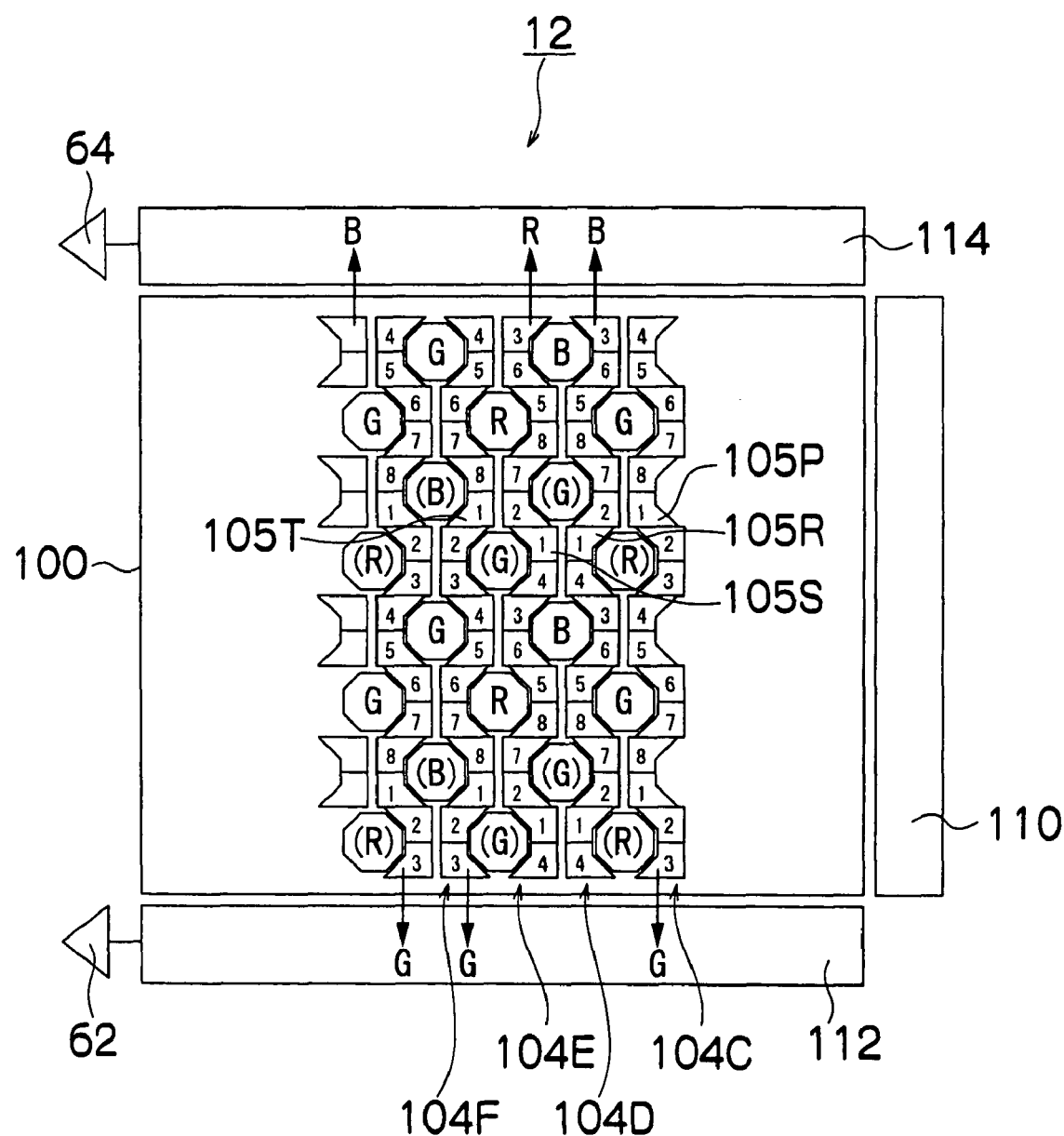
FIG. 11 is a diagram showing an application of the cross wiring shown in FIG. 4.

FIG. 11 shows the case where the wirings of the transfer electrodes 105 are crossed at every third row and a Bayer arrangement is applied to the arrangement of the color filter arrays.

In FIG. 11, the transfer electrodes 105 of the vertical transfer route 104C in the first row and the transfer electrodes 105 of the vertical transfer route 104D in the second row are cross-wired, the transfer electrodes 105 of the vertical transfer route 104D in the second row and the transfer electrodes 105 of the vertical transfer route 104E in the third row are the straight wirings, and the transfer electrodes 105 of the vertical transfer route 104F in the fourth row are the arrangement of the same transfer electrodes as that of the transfer electrodes 105 of the vertical transfer route 104C in the first row. As for the vertical transfer routes from the fifth row onward, the arrangements of the first to fourth rows are repeated.

The first-phase signal (V1) in FIG. 6 (FIG. 9) is applied first to the transfer electrode 105P in the fifth line of the vertical transfer route 104C (first row) in FIG. 11. The wirings from the transfer electrodes 105 of the vertical transfer route 104C to the transfer electrodes 105 of the vertical transfer route 104D (second row) are cross-wired, and the transfer electrode 105P is connected to the transfer electrode 105R in the sixth line so that the V1 signal is applied to the transfer electrode 105R.

The wirings from the transfer electrodes 105 of the vertical transfer route 104D to the transfer electrodes 105 of the vertical transfer route 104E (third row) are the straight wirings, where the transfer electrode 105R is connected to the transfer electrode 105S in the sixth line so that the V1 signal is applied to the transfer electrode 105S.

Furthermore, the wirings from the transfer electrodes 105 of the vertical transfer route 104E to the transfer electrodes 105 of the vertical transfer route 104F in the fourth row are cross-wired, and the transfer electrode 105S is connected to the transfer electrode 105T in the fifth line so that the V1 signal is applied to the transfer electrode 105T.

The transfer electrodes 105 to which the second-phase to eighth-phase signals are applied have the same wiring structure as the transfer electrodes 105 to which the first-phase signal is applied. In the configuration, the vertical transfer routes 104 have the transfer direction switched at every two lines. If the forward transfer VCCD pulse 200 shown in FIG. 6 is used, it is possible to transfer the signal charges to the horizontal transfer route 112 from the vertical transfer routes in the first row (vertical transfer route 104C), fourth row (vertical transfer route 104F), fifth row, eighth row and so on and transfer the signal charges to the horizontal transfer route 114 from the vertical transfer routes in the second row (vertical transfer route 104D), third row (vertical transfer route 104E), sixth row, seventh row and so on.

It is possible to exert control to transfer the G charges to the horizontal transfer route 112 and transfer the R charges and B charges to the horizontal transfer route 114 by performing an interlace (thinning-out) readout for reading the signal charges from pixel rows at every third line such as reading the signal charges from the pixel rows in the first line, reading no signal charge from the pixel rows in the second and third lines and further reading the signal charges from the pixel rows in the fourth and fifth lines.

It is also possible, as a matter of course, to exert control to send the R charges and B charges to the horizontal transfer route 112 and transfer the G charges to the horizontal transfer route 114 by using the VCCD pulse different from the control for sending the G charges to the horizontal transfer route 112 and sending the R charges and B charges to the horizontal transfer route 114 (equivalent to the reverse transfer VCCD pulse 300).

The form of the cross wiring is not limited to the above-mentioned form, but it may be the form of connecting the transfer electrode 105H to the transfer electrode 105N and connecting the transfer electrode 105M to the transfer electrode 105I in the area between a pixel 102B and a pixel 102C in FIG. 4. It is necessary, however, to apply the VCCD pulse and the color filter arrays matching with the form of the cross wiring.

According to this embodiment, a honeycomb arrangement is applied to the pixels 102. However, the arrangement of the pixels 102 is not limited thereto and a tetragonal pixel arrangement or other arrangements may also be applied.

Figure 12:
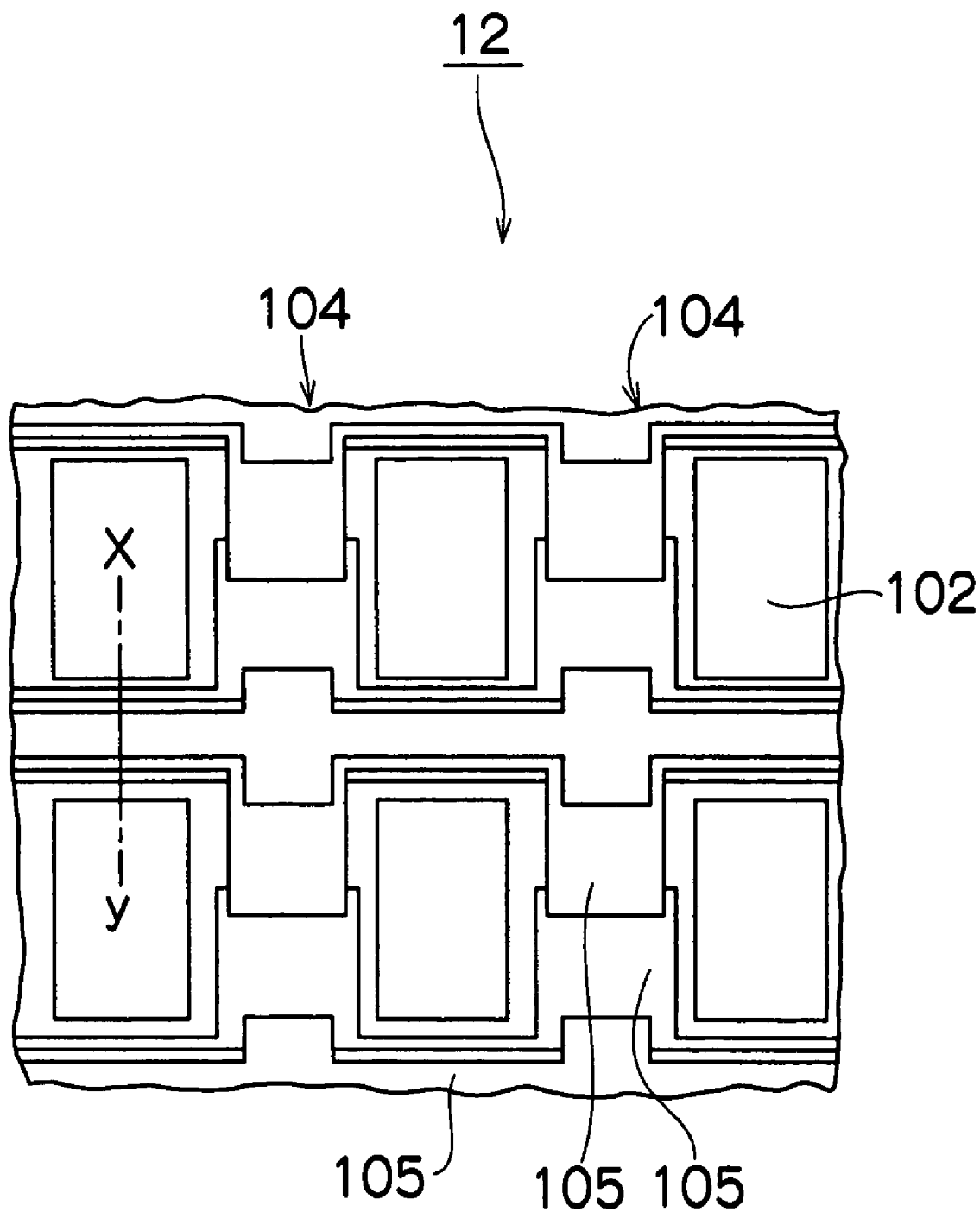
FIG. 12 is a diagram showing pixels, vertical transfer routes and transfer electrodes in a tetragonal pixel arrangement.

FIG. 12 shows the arrangement of the pixels 102 to which the tetragonal pixel arrangement is applied. The portions in FIG. 12 which are the same as or similar to those in FIG. 3 are given the same symbols, and a description thereof will be omitted.

In FIG. 12, one pixel 102 has three transfer electrodes 105 adjacent thereto, and a 3-phase or 6-phase pulse signal is applied to the VCCD pulse. It is also possible, as a matter of course, to provide four transfer electrodes 105 to one pixel 102 and apply a 4-phase or 8-phase pulse signal to the VCCD pulse.

In FIG. 3, the wiring of the transfer electrodes 105 passes through the portion indicated by X to Y, that is, an inter-pixel wiring portion where the cross wiring is performed. Likewise, in FIG. 12, the wiring of the transfer electrodes 105 also passes through the inter-pixel wiring portion indicated by X to Y, where the cross wiring is performed.

The tetragonal pixel arrangement has the inter-pixel wiring portion narrower than that in the honeycomb arrangement, and a wiring width must be smaller in order to perform the cross wiring in this portion. If the wiring width becomes smaller, wiring impedance increases so that it may result in increase in unnecessary radiation, deterioration of an S/N ratio and increase in power consumption.

If the honeycomb arrangement is applied to the arrangement of the pixels 102, it is possible to have a large inter-pixel wiring portion, which is advantageous in terms of the wiring and also has a lot of merits as to electrical characteristics.

Next, a description will be given as to preferable control of the digital camera 10 using the above-mentioned CCD 12 and the control thereof.

The output portion 62 and the output portion 64 shown in FIG. 2 include FDAs. On outputting the signal charges of each horizontal transfer route as the image-taking signals (analog signals) to the outside, the FDAs function as an amplifier for amplifying the image-taking signals.

Even in the case of using the same element for an FDA 1 included in the output portion 62 and an FDA 2 included in the output portion 64, a gain difference may arise due to a difference in output characteristics (open-loop gain, temperature characteristics and so on) between them.

As for the past technology shown in FIG. 13, the G charges are sent to the horizontal transfer route 112 and the horizontal transfer route 114, and the image-taking signals corresponding to the G charges (G signal) are outputted to the outside via the FDA 1 and FDA 2. The FDA 1 and FDA 2 have variations in the gains. Therefore, if the images are generated from these two kinds of G signals, problems such as irregular colors and fixed pattern noise are apt to occur, and besides, the two kinds of G signals must be processed by the signal processing system in a subsequent stage of the CCD 12. As a matter of course, this is the same as to R signals corresponding to R pixels and B signals corresponding to B pixels.

As described above, if it is constituted and controlled so that the signals corresponding to the same color are outputted from the same FDA, the gain difference between the FDA 1 and FDA 2 can be absorbed as a difference in a sensitivity ratio of the colors. Therefore, there is no need to consider a special correction. It is also absorbed by a WB process in an image processing operation.

As for the digital camera and CCD constituted as above, the CCD 12 comprises the two horizontal transfer routes and the two output portions corresponding thereto, and sorts the signal charges stored in the pixels to send them to the two horizontal transfer routes so as to implement acceleration of the processing in the CCD 12. It is possible, by providing the color filter arrays of the G vertical stripe RB checked arrangement to the CCD 12 and applying the cross wiring for crossing the wirings of the transfer electrodes 105 at every other row, to exert control to transfer the signal charges corresponding to G and the signal charges corresponding to R and B to different horizontal transfer routes by using the common VCCD pulse.

The signal charges in the same color are transferred to the same horizontal transfer route, and are outputted as the image-taking signals in each color via the same FDA. And even if there are the variations in the gains of the FDAs, influence of the sensitivity ratio of each color can make up for it so that there is no need to give consideration to reduce the variations in the FDAs. It is possible to correct the sensitivity ratio of each color and the variations in the gains of the FDAs by using the WB process.

It is also possible, by using the VCCD pulse different form the above described VCCD pulse, to exert control to transfer the signal charges in the reverse direction to the transfer control of the signal charges.

As the pixels 102 are arranged in the honeycomb structure, the area for performing the cross wiring can be large, and a larger wiring width of the wiring can be taken compared to an interline arrangement. If the larger wiring width can be taken, it is possible to hold back the increase in the wiring impedance, curb the occurrence of unnecessary radiation, prevent the deterioration of an S/N ratio and curb the increase in the power consumption.

Next, a description will be given as to the form of utilizing the gain difference between the FDA 1 and FDA 2. It comprises an output gain setting device which can set the output gains of the FDA 1 and FDA 2 at desired values. The output gain setting device is used to set the gain of one of the FDAs relatively higher than the gain of the other FDA.

If control is exerted to send the G charges of relatively high sensitivity out of R, G and B to the horizontal transfer route to which the FDA of relatively low sensitivity is connected and send the R and B charges of relatively low sensitivity to the other horizontal transfer route, the sensitivity difference for each color can be absorbed by the gain setting of the FDA. And in processing the color of low sensitivity, it is possible, by increasing the output gains of the CCD 12, to curb the amplification gain in the signal processing system in the subsequent stage of the CCD 12.

The output gain setting device may be constituted either to be able to set the gains of both the FDA 1 and FDA 2 or to be able to set the gain of one of the FDAs. It is also feasible to record several gain values on a recording device (ROM 20, EEPROM 24 and so on) of the camera 10 in advance so as to read the gain values recorded on the recording device according to the control of the CCD 12.

Furthermore, it is also feasible to comprise a color temperature detection device which sets the gains of the FDA 1 and FDA 2 according to the color temperature of a shooting scene. It is also possible to have a plurality of gain values for each of the FDA 1 and FDA 2 and switch the gain values according to the detected color temperature.

There are the cases where the sensitivity ratio of each color changes depending on color temperatures. For instance, the sensitivity of R and B becomes lower than that of G on the shooting scene of which color temperature is about 5500K.

However, the sensitivity of R becomes higher than that of G if the color temperature is about 3200K. Therefore, control should be exerted by switching the VCCD pulse according to the color temperature detected by the color temperature detection device to transfer the R charges to the horizontal transfer route connected to the FDA of a high gain and transfer the G charges to the horizontal transfer route connected to the FDA of a low gain.

The determination of the light source type by WB control is applicable to the color temperature detection device. It is possible to detect the color temperature of the shooting scene from the light source type determined by the determination of the light source type by the WB control.

Next, another embodiment of the present invention will be described.

As the block diagram of an overall configuration of the digital camera according to the other embodiment of the present invention is the same as FIG. 1, a description thereof will be omitted.

FIG. 13 is a plan view showing the structure of the light receiving surface of the CCD 12 according to the other embodiment. As shown in FIG. 13, pixels 1102 are placed like a matrix in a light receiving area 1100 of the CCD 12.

FIG. 13 shows the pixels approximately in the central portion in the light receiving area 1100. Hereafter, vertical sequences are the rows and horizontal sequences are the lines, and they are referred to as the first row, second row and so on from the right, and the first line, second line and so on from the top.

The pixels 1102 are in the honeycomb structure in which central points of geometrical forms of the pixels are arranged by being alternately displaced by a half of a pixel pitch (½ pitch) in the line direction and in the row direction. To be more specific, they are in the structure in which the pixel arrangement of one of the mutually adjacent lines (rows) of the pixels 1102 is placed by being relatively displaced against the pixel arrangement of the other line (row) by a half of arrangement spacing in the line direction (or in the row direction).

Among the pixel rows, vertical transfer routes 1104 for reading the charges stored in the pixels are placed close to the pixel rows as if snaking their ways. The vertical transfer route 1104 has transfer electrodes 1105 to which a vertical transfer drive pulse signal (VCCD pulse) is applied. Four transfer electrodes 1105 are provided per pixel (two electrodes on the right and left respectively), and they are shown in the frame in the vertical transfer route 1104 in FIG. 13.

The pixel 1102 has a readout gate 1106 and a readout gate 1108 for reading the stored charges to the vertical transfer route 1104 placed therein. As shown in FIG. 13, the readout gate 1106 and readout gate 1108 are placed so as to be opposed to each other in the pixel 1102.

The stored charges of each pixel 1102 is read from an odd-numbered electrode readout gate 1106 to the vertical transfer route 1104 adjacent to the right side of the pixel in FIG. 13, and is read from an even-numbered electrode readout gate 1108 to the vertical transfer route 1104 adjacent to the left side of the pixel in FIG. 13. It is controlled so that the charges stored in the pixel 1102 is read to the vertical transfer route connected respectively from one of the odd-numbered readout gate 1106 and the even-numbered readout gate 1108.

In FIG. 13, the light receiving area 1100 has a VCCD drive circuit 1110 for applying the VCCD pulse to the transfer electrode 1105 placed on the right thereof. There are the forms of the VCCD pulse such as 2-phase, 3 phase, 4-phase and 8-phase. It determines which form should be applied by drive control of the CCD such as readout speed of the CCD.

Not only the above-mentioned drive pulse but the VCCD pulse suited to CCD drive control such as a 16-phase or 32-phase pulse is applicable.

FIG. 13 illustrates the form wherein, in each pixel 1102, the odd-numbered electrode readout gate 1106 is connected to the transfer electrode 1105 on the downside and the even-numbered electrode readout gate 1108 is connected to the transfer electrode 1105 on the upside. However, the odd-numbered electrode readout gate 1106 and the even-numbered readout gate 1108 may be connected either to the transfer electrode 1105 on the upside or to the transfer electrode 1105 on the downside respectively. It is determined correspondingly to the VCCD pulse.

In FIG. 13, the light receiving area 1100 has a horizontal transfer route (HCCD) 1112 for transferring the signal charges moved from the vertical transfer route 1104 in a horizontal direction placed on the downside thereof (final downside stage of the vertical transfer route 1104). And the light receiving area 1100 has a horizontal transfer route 1114 placed on the upside thereof (final upside stage of the vertical transfer route 1104).

The horizontal transfer route 1112 and the horizontal transfer route 1114 are transfer-controlled by the two-phase driving pulse, and the charges are transferred from the right to the left in FIG. 13. They are connected to an output portion 162 and an output portion 164 in the final stages thereof (leftmost stages in FIG. 13) respectively.

The output portion 162 and the output portion 164 include the output amplifier (floating diffusion amplifier) which detects the charges of inputted signal charges and outputs them as signal voltage to the output terminal. Thus, the signals photoelectrically converted by the pixels 1102 are outputted as the dot sequential signal row.

To be more specific, if the light gets incident on the pixels 1102, an amount of the charges according to a light volume thereof is stored in the photo-diodes of the pixels 1102. And the charges stored in the pixels 1102 are read to the vertical transfer route 1104 corresponding to each pixel according to the field shift pulse.

On the vertical transfer route 1104, the charges read from the pixels 1102 are sequentially transferred to the horizontal transfer route 1112 or the horizontal transfer route 1114 by the VCCD pulse. Details of the vertical transfer control over the charges will be described later.

If the charge per pixel line is transferred to the lowermost or uppermost stage (the portion connected to the horizontal transfer route) of the vertical transfer route 1104, the charge is read from the vertical transfer route 1104 to the horizontal transfer route 1112 or the horizontal transfer route 1114 according to the transfer gate pulse.

According to the above-mentioned configuration, the charge stored in each pixel belonging to one pixel row is read to the corresponding vertical transfer route 1104 in the same timing, and is transferred to the horizontal transfer route 1112 or the horizontal transfer route 1114 in the same timing. The pixel has the odd-numbered electrode readout gate 1106 and the even-numbered electrode readout gate 1108 provided thereto, and it is selectively controllable as to each pixel (each pixel row) whether to transfer the charge to the horizontal transfer route 1112 or to the horizontal transfer route 1114.

Figure 14:
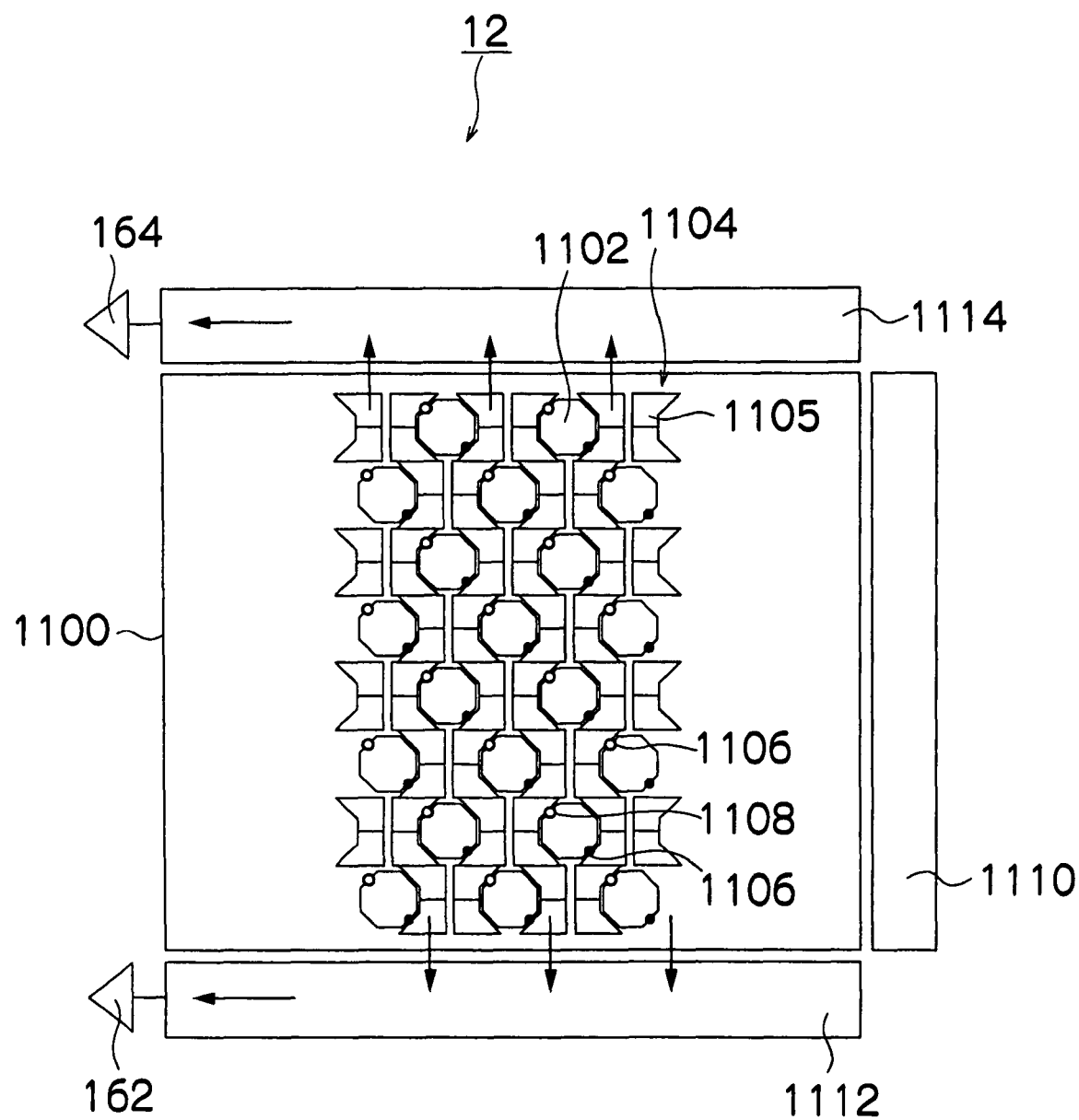
FIG. 14 is a diagram showing a deformation example of the CCD shown in FIG. 13.

FIG. 14 shows the form in which the pixel in the even-numbered row comprises the odd-numbered electrode readout gate 1106 and the even-numbered electrode readout gate 1108, and the pixel in the odd-numbered row comprises the odd-numbered electrode readout gate 1106. As shown in FIG. 14, it may be either all the pixels or only necessary pixels that comprise the odd-numbered electrode readout gate 1106 and the even-numbered readout gate 1108.

Next, a description will be given as to stored charge readout control and vertical transfer control of the CCD 12 for transferring the signal charges to the horizontal transfer route 1112 from a certain vertical transfer route and transferring them to the horizontal transfer route 1114 from another vertical transfer route by using one VCCD pulse.

Figure 15:
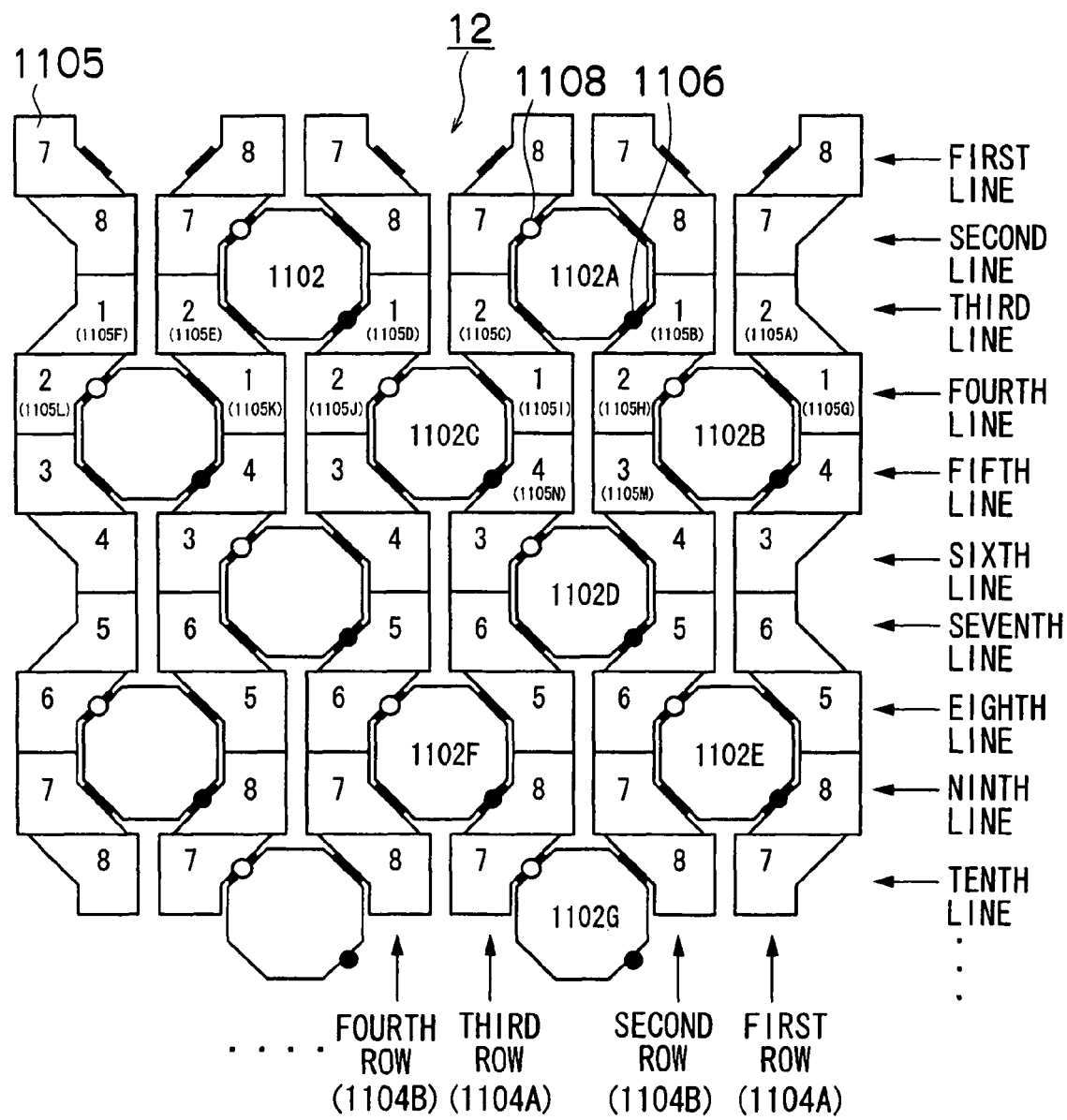
FIG. 15 is an enlarged view of the CCD shown in FIG. 13.

FIG. 15 is an enlarged view of a part of the light receiving area 1100 shown in FIG. 13. FIG. 16 show the transition of the VCCD pulse (4-phase signal) 1200 and the vertical transfer of the charge (reference numerals 1210 and 1212). The portions in FIG. 15 which are the same as or similar to those in FIG. 13 are given the same symbols, and a description thereof will be omitted.

Figure 16A:
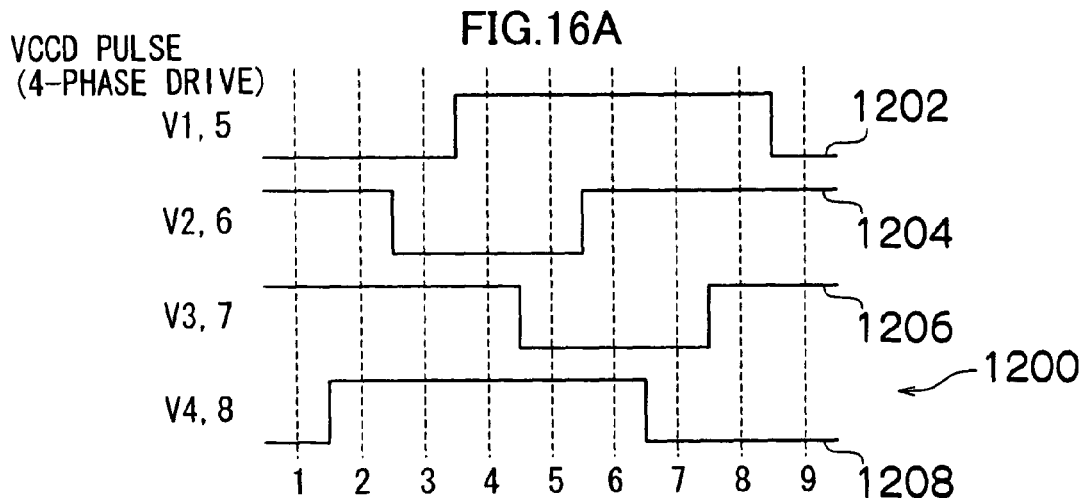
FIG. 16A is a diagram showing a waveform of a VCCD pulse.

In FIG. 15, the transfer electrodes 1105 of the vertical transfer route 1104 are numbered 1 to 8 which are equivalent to the numbers of the phases of the VCCD pulse (4-phase signal) shown in FIG. 16A.

For instance, FIG. 15 shows that the transfer electrode 1105 indicated as "1" has a first-phase signal (fifth-phase signal) 1202 indicated at "V1 (V1, 5)" in FIG. 16A applied thereto. Likewise, the numbers indicated at the transfer electrodes 1105 in FIG. 15 are corresponding to the phases of the VCCD pulse in FIG. 16A.

As for the VCCD pulse 1200 shown in FIG. 16A, the driving signals of the same phase are applied to the first and fifth phases (reference numeral 1202), second and sixth phases (reference numeral 1204), third and seventh phases (reference numeral 1206) and fourth and eighth phases (reference numeral 1208).

The wirings of the transfer electrodes 1105 among the vertical transfer routes are the cross wirings in which the wirings intersect three-dimensionally among the vertically and horizontally adjacent pixels.

According to an example of the cross wiring, the transfer electrodes 1105 to which the first-phase signal in FIG. 16A is applied are wired so as to be connected to the electrodes of reference numerals 1105G, 1105B, 1105I, 1105D, 1105K, 1105F and so on shown in FIG. 15. The transfer electrodes 1105 to which the second-phase signal in FIG. 16A is applied are wired so as to be connected to the electrodes of reference numerals 1105A, 1105H, 1105C, 1105J, 1105E, 1105L and soon shown in FIG. 15. To be more specific, the wirings in the third and fourth lines are replaced each time the wiring is performed in the adjacent row.

Likewise, the above-mentioned cross wiring is performed at the transfer electrodes 1105 to which the third-phase signals are applied and the transfer electrodes 1105 to which the fourth-phase signals are applied, the transfer electrodes 1105 to which the fifth-phase signals are applied and the transfer electrodes 1105 to which the sixth-phase signals are applied, and the transfer electrodes 1105 to which the seventh-phase signals are applied and the transfer electrodes 1105 to which the eighth-phase signals are applied in FIG. 16A.

As for the CCD 12 constituted as above, it is possible, by using the VCCD pulse 1200 shown in FIG. 16A, to transfer the charges to the horizontal transfer route 114 (upside) from the odd-numbered vertical transfer route 104A and transfer the charges to the horizontal transfer route 112 (downside) from the even-numbered vertical transfer route 104B.

In the case where the vertical transfer direction is one direction, the wiring is performed so that the signals of the same phase will be applied to the transfer electrodes 1105 on the same line in FIG. 15. To be more specific, it is the straight wiring wherein the first-phase signal 1202 of the VCCD pulse 1200 shown in FIG. 16A is applied to the transfer electrodes 1105 on the third line in FIG. 15, and the transfer electrodes 1105A, 1105B, 1105C, 1105D, 1105E, 1105F, and so on in FIG. 15 are connected.

The second-phase signal 1204 of the VCCD pulse in FIG. 16A is applied to the transfer electrodes 1105 on the fourth line, and the transfer electrodes 1105G, 1105H, 1105I, 1105J, 1105K, 1105L and so on are connected.

Figure 16B:
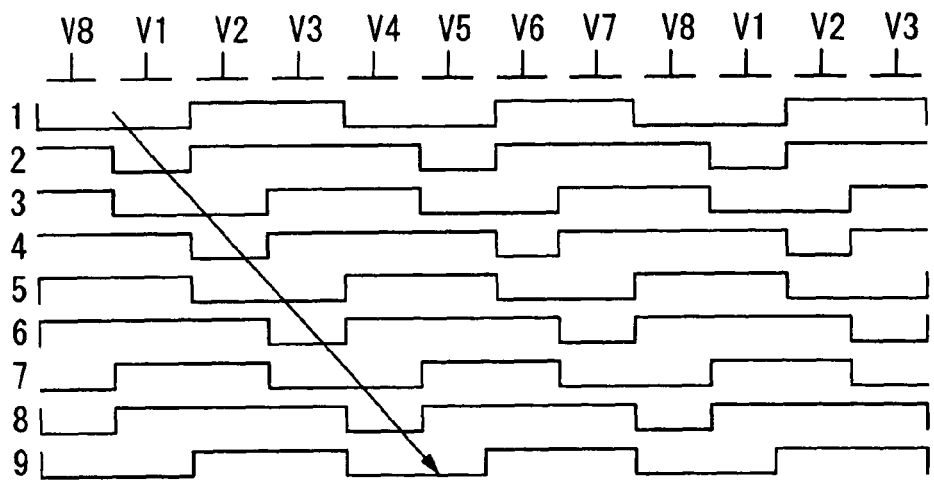
FIG. 16B is a diagram showing a charge transfer transition by the VCCD pulse shown in FIG. 16A.
Figure 16C:
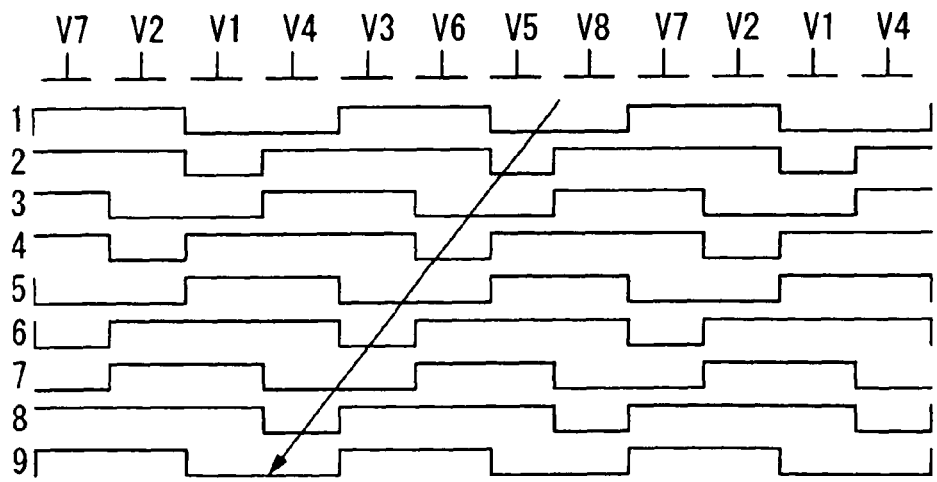
FIG. 16C is a diagram showing the charge transfer transition by the VCCD pulse shown in FIG. 16A.

FIG. 16B shows the transition of the charges on the vertical transfer route (reference numeral 104B in FIG. 15) for transferring the charges to the horizontal transfer route 1112 (transferring them downward) in FIG. 14, and FIG. 16C shows the transition of the charges on the vertical transfer route (reference numeral 104A in FIG. 15) for transferring the charges (transferring them upward) to the horizontal transfer route 1114 in FIG. 14.

In the transition diagrams shown in FIGS. 16B and 16C, reference characters V1 to V8 designate the electrodes to which the signals of the phases of the VCCD pulse 1200 are applied, where the order from the left in FIGS. 16B and 16C corresponds to the order from the top on the vertical transfer route 104B in FIG. 15. To be more specific, they are arranged in order of V8, V1, V2, . . . , V8 from the left in FIG. 16B, and are arranged in order of 8, 1, 2, . . . , 8 (tenth line) from the second line on the vertical transfer route 104B in the even-numbered row in FIG. 15. They are arranged in order of V7, V2, V1, V4, V3, V6, V5, V8, V7 . . . from the left in the transition diagram in FIG. 16C, and are correspondingly arranged in order of 7, 2, 1, 4, 3, 6, 5, 8, 7 (tenth line), . . . from the second line on the vertical transfer route 104A in the odd-numbered row in FIG. 15.

The numbers indicated at the left end of FIGS. 16B and 16C denote the state of the VCCD pulse 1200 shown in FIG. 16A on the time-series axis, which corresponds to the state of the VCCD pulse (horizontal system) shown in FIG. 16A.

As for the VCCD pulse and the transition diagrams shown in FIGS. 16A to 16C, the L level indicates the effectiveness and the H level indicates the non-effectiveness, where, if the L level is applied to the transfer electrodes 1105 shown in FIG. 15, the charges exists at relevant positions.

In the state 1 in FIG. 16A, the charges exist at the positions numbered 1, 4, 5 and 8 in FIG. 15. To be more specific, the charges are stored at the positions of the fourth, fifth, eighth and ninth lines on the vertical transfer route 104A, and they are stored at the positions of the second, third, sixth and seventh lines on the vertical transfer route 104B.

In a state 2 in FIG. 16A, the transfer electrodes 1105 numbered 4 and 8 in FIG. 15 transit to the H level (non-effective). The positions numbered 4 and 8 are the barriers of the charges, and the charges are stored at the positions numbered 1 and 5.

Next, in the state 3 in FIG. 16A, the positions numbered 2 and 6 in FIG. 15 are at the L level, and the charges are shifted downward on the vertical transfer route 1104B and are shifted upward on the vertical transfer route 1104A.

Thereafter, in the state 4 in FIG. 16A, the transfer electrodes 1105 numbered 1 and 5 in FIG. 15 transit to the H level. The positions numbered 1 and 5 are the barriers of the charges, and the charges are stored at the transfer electrodes 1105 numbered 2 and 6.

If the state thus transits in order, the vertical transfer route 1104B has the charges transferred in the direction of the horizontal transfer route 114 (upward) and the vertical transfer route 1104A has the charges transferred in the direction of the horizontal transfer route 112 (downward).

As for the CCD 12 constituted as above, it is possible, as each pixel 1102 comprises the two readout gates of the odd-numbered electrode readout gate 1106 and the even-numbered electrode readout gate 1108, to selectively determine whether to transfer the charges stored in the pixel to the horizontal transfer route 1112 or to the horizontal transfer route 114 as to each pixel.

As for a pixel 1102A for instance, the charges read from the odd-numbered electrode readout gate 1106 are transferred to the horizontal transfer route 114, and the charges read from the even-numbered electrode readout gate 1108 are transferred to the horizontal transfer route 1112.

A description will be given as to the control whereby the charges are transferred to a different horizontal transfer route for each color of the color filter (CF) provided to the CCD 12 by using the above-mentioned transfer control of the charges.

Figure 17:
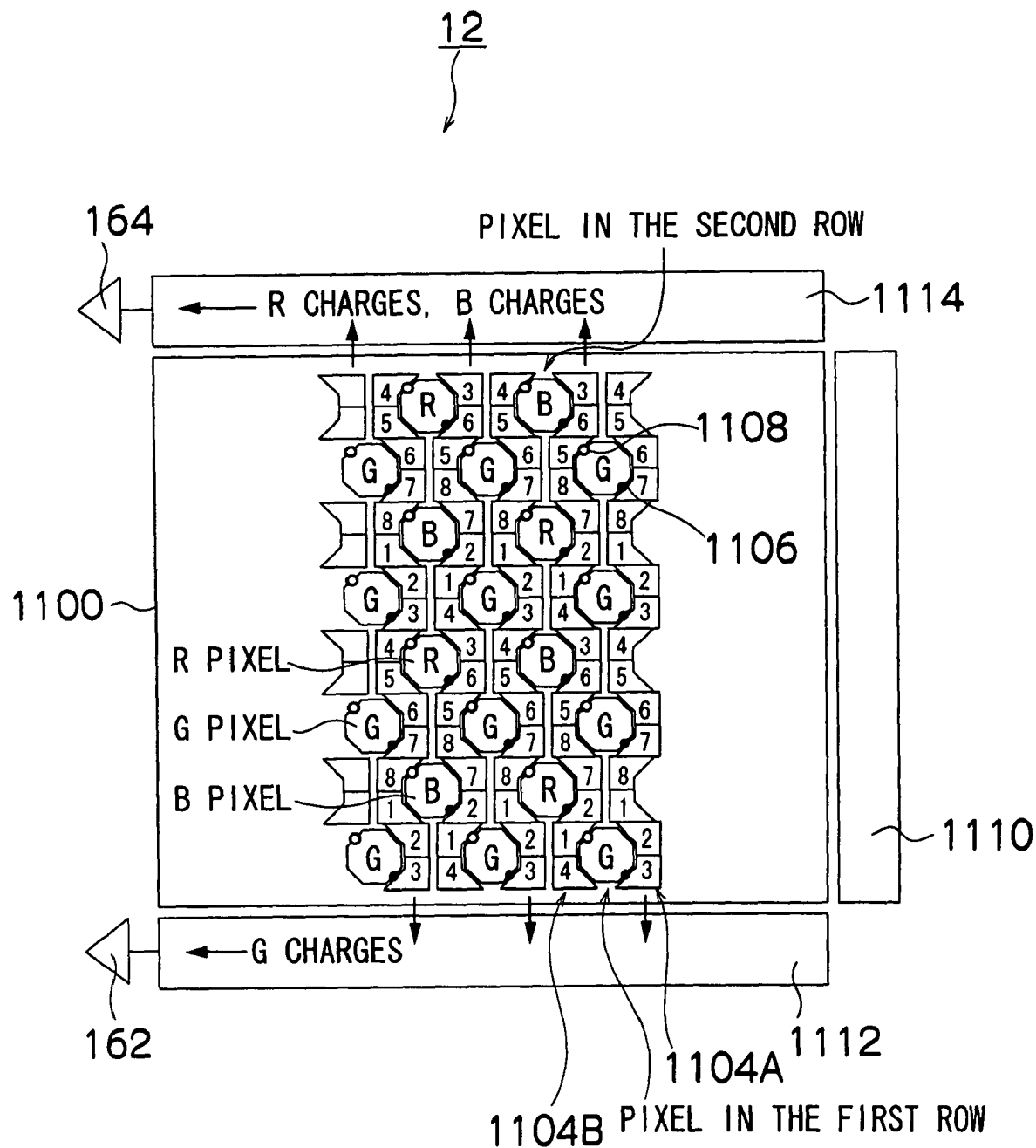
FIG. 17 is a diagram showing vertical transfer control when shooting a static image.

FIG. 17 is a diagram showing the colors of the CFs in the pixels of the CCD 12 shown in FIGS. 13 and 15. The portions in FIG. 17 which are the same as or similar to those in FIGS. 13 and 15 are given the same symbols, and a description thereof will be omitted.

The CCD 12 has the CF arrays placed as if covering the light receiving area 1100. The CF array is comprised of the CFs placed one by one on the upper side of each individual photodiode. There are the CF arrays in three primary colors and the CF arrays in complementary colors. As for the CF arrays in the complementary colors, those comprised only of the CFs in the complementary colors and those comprised of the CFs in the complementary colors and green CFs are known. The color of the CF is the color of the pixel.

Each individual pixel of the single-panel CCD has the photodiode which is the photoelectric conversion element and one CF placed on the upper side thereof, and further has a micro-lens placed on the CF for the sake of improving concentration efficiency.

FIG. 17 shows the case where the CF arrays of the G stripe RB checked arrangement is provided to the above-mentioned CCD 12. Reference characters R, G and B shown in FIG. 17 designate a red filter, a green filter and a blue filter respectively. The pixels corresponding to the red filter, green filter and blue filter are described as an R pixel, a G pixel and a B pixel respectively, and the charges stored in the R pixel, G pixel and B pixel are described as the R charge, G charge and B charge respectively.

The G stripe RB checked arrangement is the CF array having alternately placed the pixel line on which the G filters are arranged and the pixel line on which the R filters and B filters are alternately arranged therein.

If the stored charges are read from the odd-numbered electrode readout gate 1106 as to all the pixels, the stored charges are read to the vertical transfer route 1104 adjacent to the right side of each pixel. For instance, the G charges stored in the pixels in the first row are read to the vertical transfer route 1104A, and the read G charges are transferred to the horizontal transfer route 1112 to be signal-outputted from the output portion 162. The R and B charges stored in the pixels in the second row are read to the vertical transfer route 1104B, and the read R and B charges are transferred to the horizontal transfer route 1114 to be signal-outputted from the output portion 164.

If the charges in the same color are transferred to different output portions, it may cause the irregular color and pattern noise on the image due to differences in the characteristics of the output portion such as the gain of an output amplifier. Therefore, it is desirable to transfer the charges in the same color to the same output portion.

Figure 18:
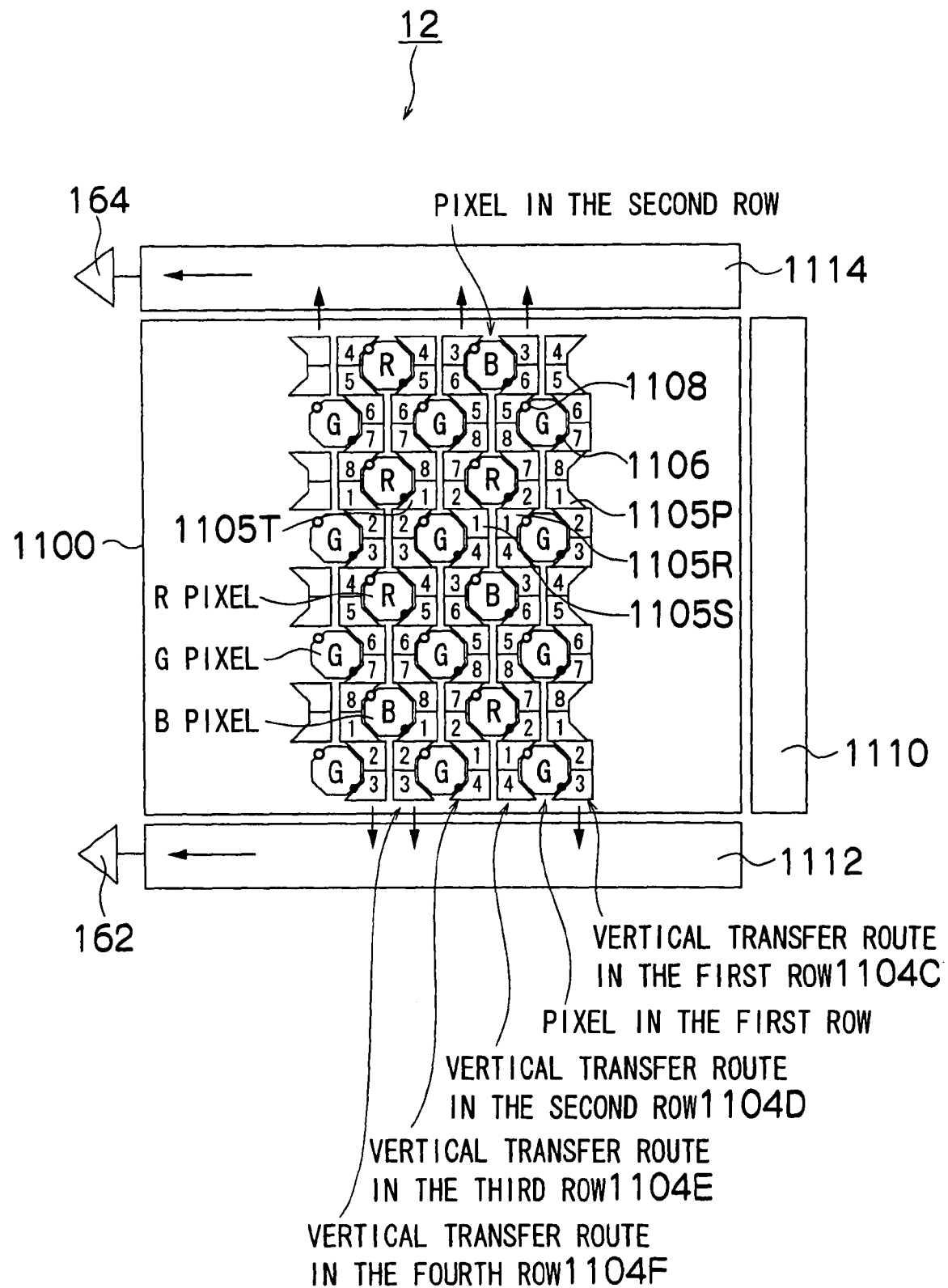
FIG. 18 is a diagram showing a deformation example of the vertical transfer control shown in FIG. 17.

FIG. 18 shows the above-mentioned deformation example of the CCD 12. In FIG. 18, the transfer electrodes 1105 of the vertical transfer route 1104C in the first row and the transfer electrodes 1105 of the vertical transfer route 1104D in the second row are cross-wired, the transfer electrodes 1105 of the vertical transfer route 1104D in the second row and the transfer electrodes 1105 of the vertical transfer route 1104E in the third row are the straight wirings, and the transfer electrodes 1105 of the vertical transfer route 1104F in the fourth row are the arrangement of the same transfer electrodes as that of the transfer electrodes 1105 of the vertical transfer route 1104C in the first row. As for the vertical transfer routes from the fifth row onward, the arrangements of the first to fourth rows are repeated.

The first-phase signal (V1) in FIG. 16A is applied first to the transfer electrode 1105P in the fifth line of the vertical transfer route 1104C (first row) in FIG. 18. The wirings from the transfer electrodes 1105 of the vertical transfer route 1104C to the transfer electrodes 1105 of the vertical transfer route 1104D (second row) are cross-wired, and the transfer electrode 1105P is connected to the transfer electrode 1105R in the sixth line so that the V1 signal is applied to the transfer electrode 1105R.

The wirings from the transfer electrodes 1105 of the vertical transfer route 1104D to the transfer electrodes 1105 of the vertical transfer route 1104E (third row) are the straight wirings, where the transfer electrode 1105R is connected to the transfer electrode 1105S in the sixth line so that the V1 signal is applied to the transfer electrode 1105S.

Furthermore, the wirings from the transfer electrodes 1105 of the vertical transfer route 1104E to the transfer electrodes 1105 of the vertical transfer route 1104F in the fourth row are cross-wired, and the transfer electrode 1105S is connected to the transfer electrode 1105T in the fifth line so that the V1 signal is applied to the transfer electrode 1105T.

The transfer electrodes 1105 to which the second-phase to eighth-phase signals are applied have the same wiring structure as the transfer electrodes 1105 to which the first-phase signal is applied. In the configuration, the vertical transfer routes 1104 have the transfer direction switched at every two lines. The charges are transferred to the horizontal transfer route 1112 from the vertical transfer routes in the first row (vertical transfer route 1104C), fourth row (vertical transfer route 1104F), fifth row, eighth row and so on, and the charges are transferred to the horizontal transfer route 1114 from the vertical transfer routes in the second row (vertical transfer route 1104D), third row (vertical transfer route 1104E), sixth row, seventh row and so on.

The form of the cross wiring is not limited to the above-mentioned form, but it may be the form of connecting the transfer electrode 1105H to the transfer electrode 1105N and connecting the transfer electrode 1105M to the transfer electrode 1105I in the area between a pixel 1102B and a pixel 1102C in FIG. 15. It is necessary, however, to apply the VCCD pulse matching with the form of the cross wiring.

Figure 19:
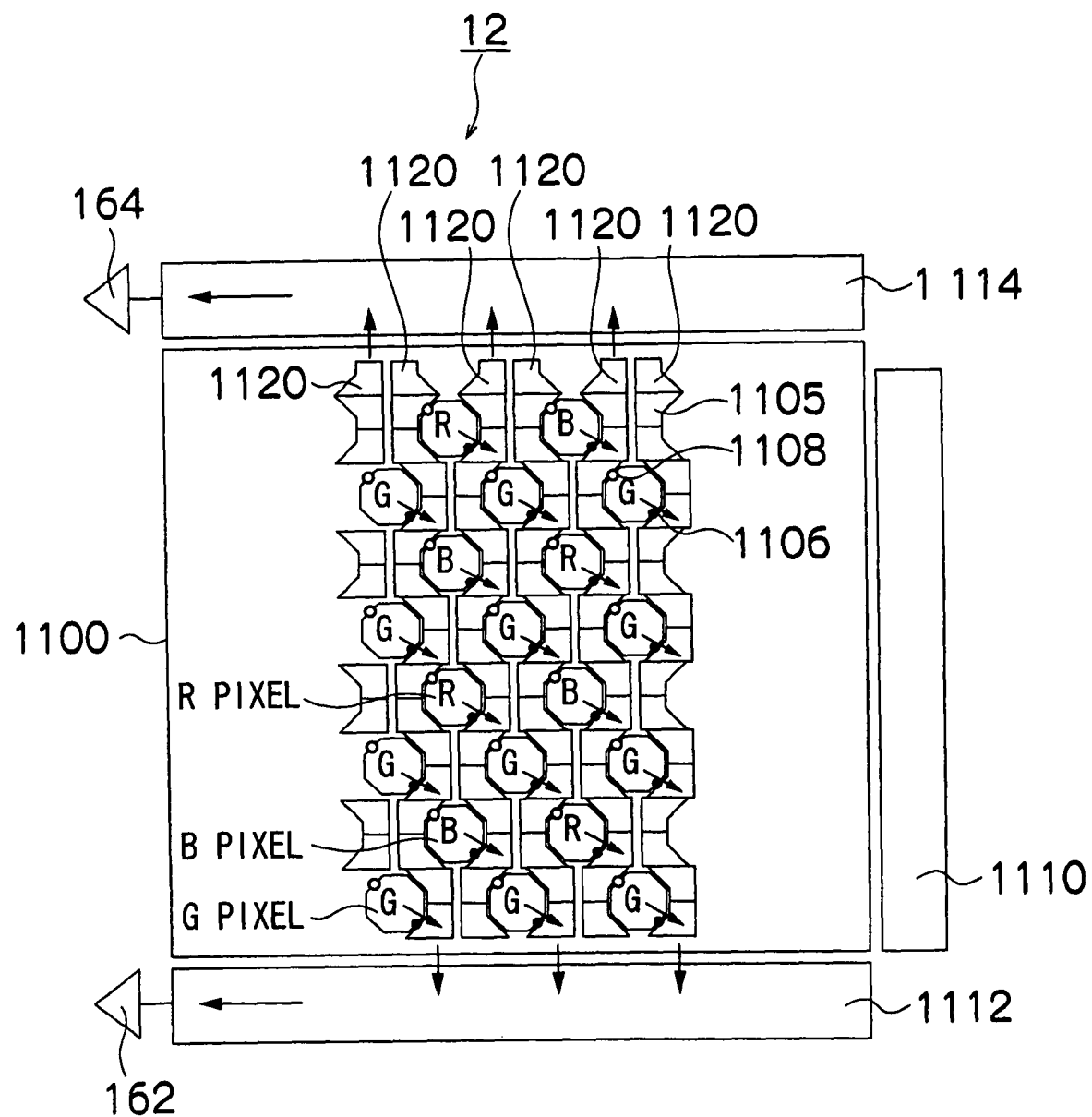
FIG. 19 is a diagram showing an application comprising a barrier electrode.

FIG. 19 shows the form in which barrier electrodes 1120 are provided between the horizontal transfer route 1114 and final electrodes to which the horizontal transfer route 1114 and the vertical transfer routes are connected.

When shooting the static image, it is necessary, in the case of controlling the horizontal transfer of the charges on the horizontal transfer routes 1112 and 1114 with the same drive pulse signal, to exert control not to simultaneously send the charges from each vertical transfer route to the horizontal transfer routes 1112 and 1114.

As for the timing in sending the charges from each vertical transfer route to the horizontal transfer route 1112, it is possible to exert control to delay the timing for the horizontal transfer route 1114 by that for the barrier electrodes 1120 (one state in FIG. 19) so as to prevent the charges from being simultaneously sent from each vertical transfer route to the horizontal transfer routes 1112 and 1114.

The barrier electrodes 1120 may be provided between each vertical transfer route and the horizontal transfer route 1112.

Next, a description will be given as to the control of the CCD 12 when shooting the moving image.

In the case of the static image, the control of the CCD 12 for reading all the pixels is exerted in order to obtain as large a signal charge amount (information amount) as possible. In the case of the moving image, the interlace (thinning-out) readout control of the CCD 12 is exerted with an emphasis on continuity of the images.

For instance, when shooting the moving image, it is possible, by exerting control to obtain the signals only from one of the output portion 162 and the output portion 164, to reduce the time required for a readout to half of the static image shooting. However, the signal charge amount (information amount) obtainable by one readout is also reduced to half of the static image shooting.

Figure 20:
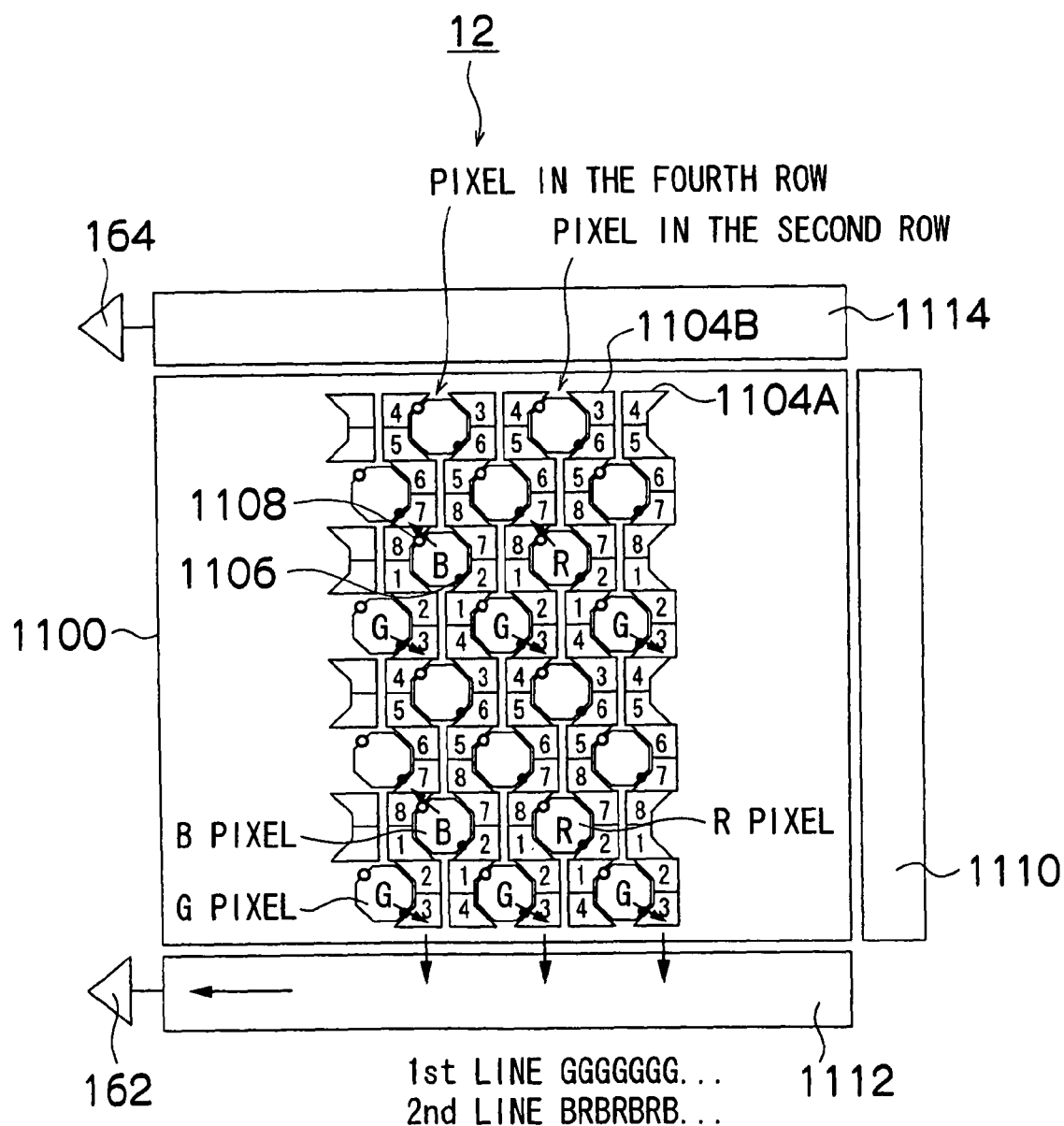
FIG. 20 is a diagram showing the vertical transfer control when shooting a moving image.

FIG. 20 is a diagram for explaining the charge readout control and the vertical transfer control of the CCD 12 when shooting the moving image.

When shooting the moving image, control is exerted to read the signals only from the output portion 162. The downside of the CCD 12 in FIG. 20 becomes the upside in the shot image, and it is possible, by reading the signals from the output portion 162, to omit a process of switching the top and bottom of the image on generating the image.

As for the vertical transfer control of the CCD 12 shown in FIG. 17, only the G charges are sent to the horizontal transfer route 1112 so that no image can be generated. Therefore, the R charges and B charges must be transferred to the horizontal transfer route 1112.

As for the pixels 1102 in the even-numbered rows such as the second and fourth rows, it is possible, by exerting control to read the stored charges from the even-numbered electrode readout gate 1108 to the vertical transfer route 1104A, to have the R charges, G charges and B charges read to the vertical transfer route 1104A so as to become transferable to the horizontal transfer route 1112.

However, the G charges will be mixed with the R charges or B charges on the horizontal transfer if the stored charges of the pixels 1102 (G charges) in the second line and the stored charges of the pixels 1102 (R charges or B charges) in the third line are read to the vertical transfer route 1104A in the same timing. Therefore, the readout control of the stored charges from each pixel line to the vertical transfer routes 1104 should be the interlace control for reading them at every two lines.

To be more specific, the stored charges are not read from the pixels in the first line (R pixels and B pixels) and the pixels in the second line (G pixels) but they are read from the pixels in the third line (R pixels and B pixels) and the pixels in the fourth line (G pixels). Furthermore, control is exerted to read no stored charge from the pixels in the fifth line and the sixth line but read them from the pixels in the seventh line (R pixels and B pixels) and the pixels in the eighth line (G pixels), and thus the mixture of the charges of the G pixels, R pixels and B pixels can be prevented. The pixels 1102 with no CF color indication in FIG. 20 are those reading no charge and to be thinned out.

Furthermore, as for the above-mentioned CCD 12, no control is exerted to read the stored charges from the G pixels to the vertical transfer route 1104B either in the static image shooting or in the moving image shooting. Therefore, as to the G pixels, the form of comprising only the odd-numbered electrode readout gate and no even-numbered electrode readout gate is possible.

In the case of the CCD 12 constituted as above, the pixel 1102 comprises the odd-numbered electrode readout gate 1106 and the even-numbered electrode readout gate 1108, and is able to read the stored charges either to the vertical transfer route 1104A or to the vertical transfer route 1104B as the two adjacent vertical transfer routes. Therefore, it is possible, according to the vertical transfer control, to read the stored charges either to the vertical transfer route 1104A for transferring the charges to the horizontal transfer route 1112 or to the vertical transfer route 1104B for transferring the charges to the horizontal transfer route 1114.

It is possible, by comprising the G stripe RB checked arrangement CF array and applying the predetermined cross wiring to the wirings of the transfer electrodes 1105, to exert control to transfer the charges corresponding to green (G charges) to the horizontal transfer route 1112, output the signals corresponding to green (G signals) from the output portion 164, transfer the charges corresponding to red and blue (R charges and B charges) to the horizontal transfer route 1114 and output the signals corresponding to red (R signals) and the signals corresponding to blue (B signals) from the output portion 164. Therefore, it is possible to prevent the occurrence of the irregular colors and pattern noise on the image due to the difference in the characteristics between the output portions 162 and 164. Furthermore, it is possible to obtain the G signals used to generate the luminance signals separately from the R signals and B signals so as to omit the process of separating the G signals performed for the sake of generating the luminance signals on generating the image shot as the static image and alleviate a burden of processing in the subsequent stages.

The digital camera 10 comprising the CCD 12 has an output changeover circuit 166 for switching as to whether obtaining a charge signal from the output of the output portions 162 or the output portions 164. Therefore, it no longer requires the signal processing circuits for the two lines correspondingly to the two output portions, and is able to selectively obtain the charge signal from any output.

When shooting the moving image, the R pixels and B pixels read the stored charges from the even-numbered electrode readout gate 1108 to the vertical transfer route 1104A. Furthermore, to avoid the mixture of the G charges with the R charges and B charges, the stored charges are read from the pixels in the successive two lines and no charge is read from the pixels in the successive two lines thereafter so as to transfer the R charges, G charges and B charges together to the horizontal transfer route 1112 by using such an interlace readout. Control is exerted in the output changeover circuit 166 to obtain the signals only from the output portions 162. Thus, the control of the CCD 12 desirable for the moving image shooting is possible.

This embodiment illustrates the honeycomb arrangement as the pixel arrangement. However, the present invention is also applicable to the tetragonal pixel arrangement. The tetragonal pixel arrangement nonetheless requires the wiring area for performing the cross wiring, which blocks density growth. In addition, the tetragonal pixel arrangement has the wiring area smaller than that in the honeycomb arrangement, and so the problems such as the increase in the wiring impedance and occurrence of unnecessary radiation may arise.

The honeycomb structure can take larger wiring space compared to the tetragonal arrangement so as to lower the wiring impedance. Thus, it is possible to curb the occurrence of unnecessary radiation, deterioration of the S/N ratio and increase in the power consumption and simultaneously realize the density growth.

This embodiment illustrates the G stripe RB checked arrangement. However, the scope of the present invention is not limited thereto but is applicable to the CF arrays of the Bayer arrangement and other arrangements.

Figure 21:
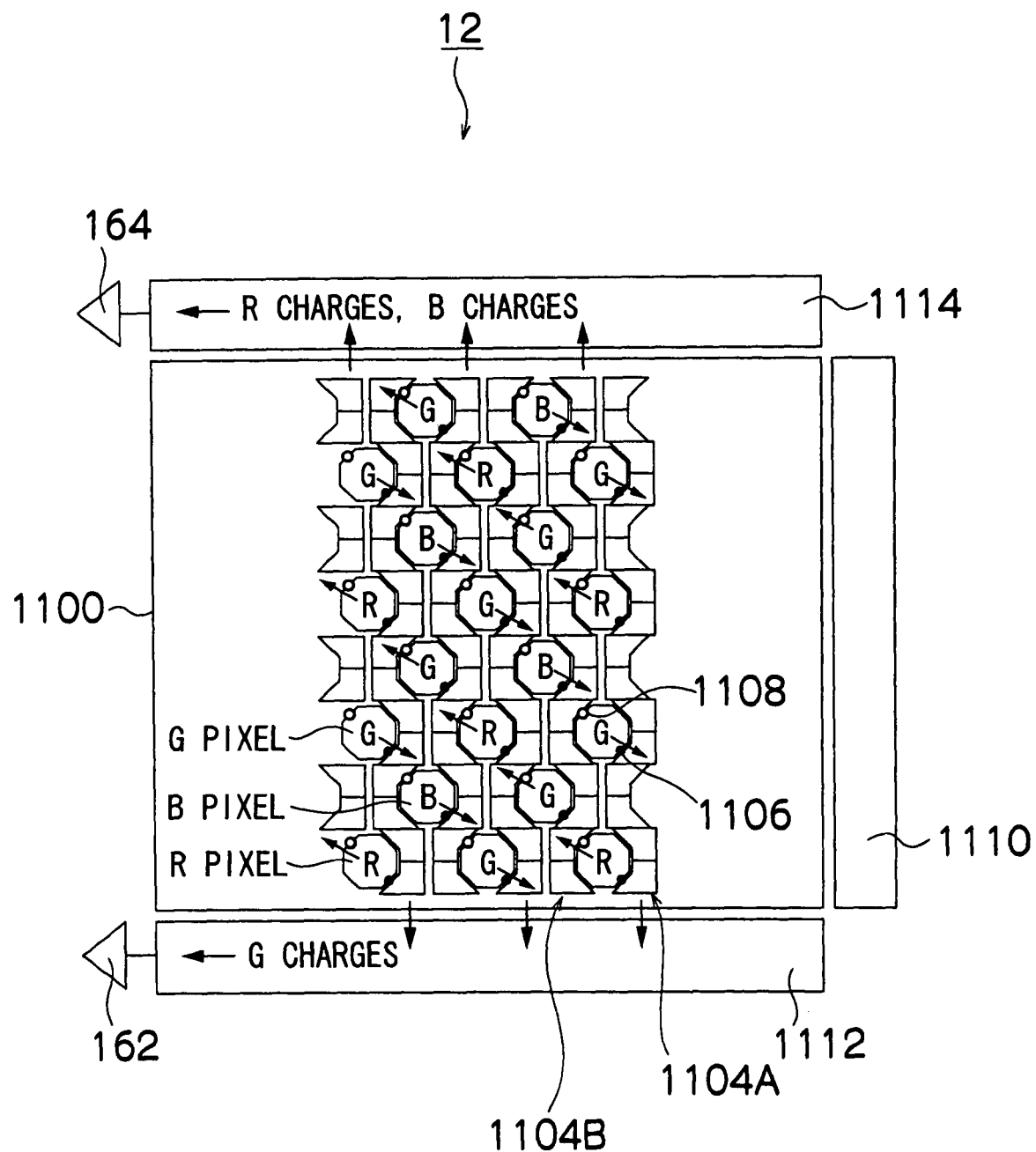
FIG. 21 is a diagram in which a CF array of a different arrangement from the one shown in FIG. 17 is applied.
Figure 22:
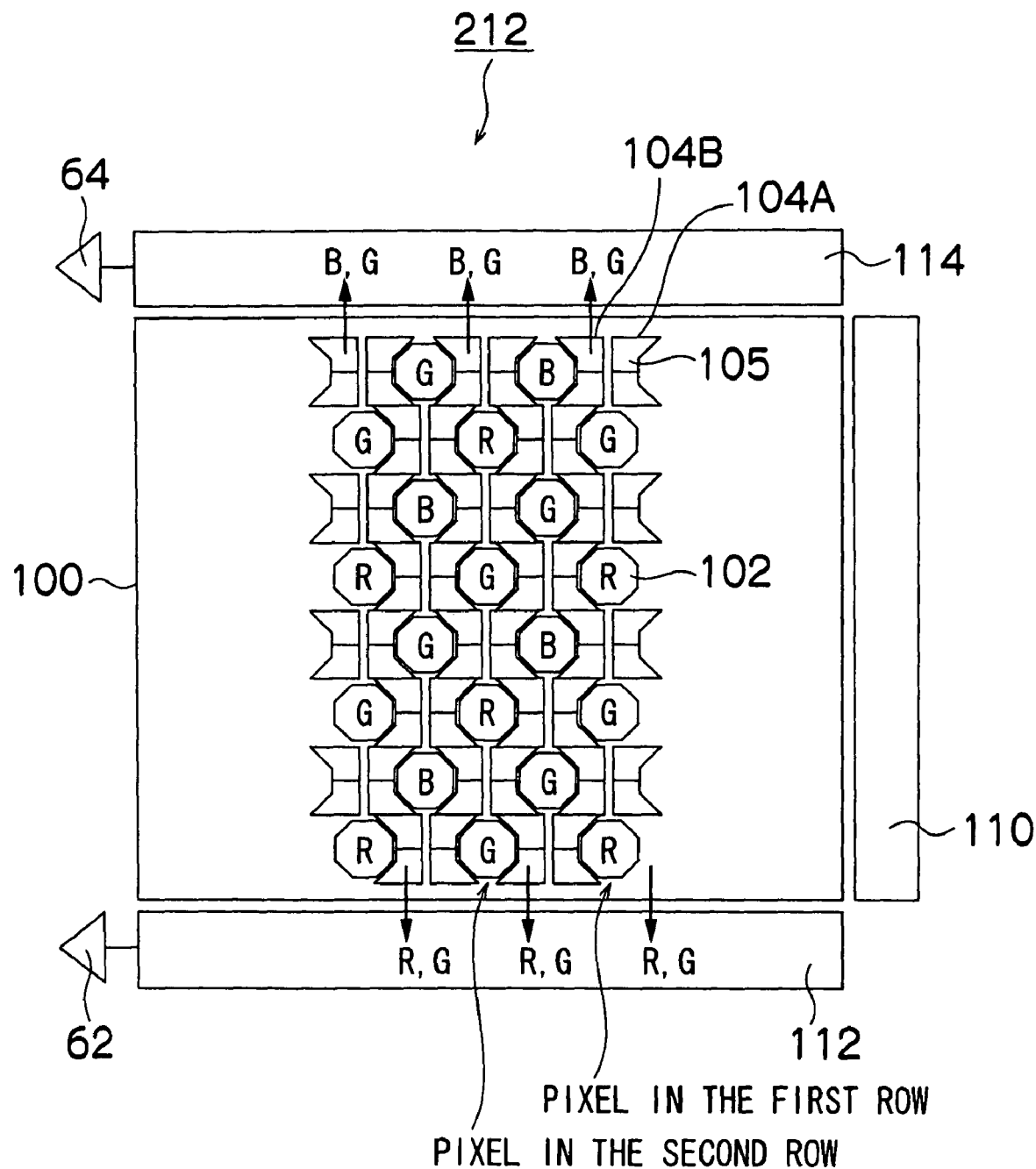
FIG. 22 is a diagram showing a past example of the present invention.

A description will be given by using FIG. 21 as to the stored charge readout control and the vertical transfer control of the CCD 12 comprising the CF arrays of a representative Bayer arrangement. As for the CF arrays of the Bayer arrangement shown in FIG. 21, the G pixels and B pixels are alternately arranged in the pixel arrangements in the odd-numbered rows, and the G pixels and R pixels are alternately arranged in the pixel arrangements in the even-numbered rows. And the G pixels and R pixels are alternately arranged in the pixel arrangements in the odd-numbered lines, and the G pixels and B pixels are alternately arranged in the pixel arrangements in the even-numbered lines.

If the above-mentioned cross wiring and vertical transfer control of the transfer electrodes 1105 are applied to the CCD 12 comprising the above-mentioned CF arrays of the Bayer arrangement, the G charges and B charges are read to the vertical transfer route 1104A in the odd-numbered row and the G charges and B charges are transferred to the horizontal transfer route 1112. In addition, the G charges and R charges are read to the vertical transfer route 1104B in the even-numbered row and the G charges and R charges are transferred to the horizontal transfer route 1114.

However, in view of the signal processing (generation of the luminance signals for instance) in the subsequent circuits of the CCD 12 by using the G signals generated from the G charges, the form of transferring the G charges to the horizontal transfer route different from that of the R charges and B charges is desirable.

As for the pixels in the odd-numbered rows, the G pixels read the stored charges from the odd-numbered electrode readout gate 1106, and the R pixels read the stored charges from the even-numbered electrode readout gate 1108. As for the pixels in the even-numbered rows, the B pixels read the stored charges from the odd-numbered electrode readout gate 1106, and the G pixels read the stored charges from the even-numbered electrode readout gate 1108. An arrow from each pixel in FIG. 21 indicates the direction for reading the stored charges.

If thus controlled, the G charges are read to the vertical transfer route 1104A, and the R charges and B charges are read to the vertical transfer route 1104B. The G charges are transferred to the horizontal transfer route 1112, and the R charges and B charges are transferred to the horizontal transfer route 1114.

It is also possible, in the case of comprising the CF arrays of the Bayer arrangement, to exert the same readout control and vertical transfer control as the control on the moving image shooting shown in FIG. 20. Control is exerted to read the stored charges from the odd-numbered electrode readout gate 1106 as to the pixels 1102 in the odd-numbered rows and read the stored charges from the even-numbered electrode readout gate 1108 as to the pixels 1102 in the even-numbered rows so that the R charges, G charges and B charges are read together to the vertical transfer route 1104A and transferred to the horizontal transfer route 1112.

It is also possible, on the vertical transfer route 1104A, to set readout timing for the odd-numbered electrode readout gate and the even-numbered electrode readout gate so that the mixture of the R charges and G charges and mixture of the B charges and G charges will not occur.

To prevent the mixture of the charges read from different pixels on the vertical transfer route 1104A, the form of performing the interlace readout may also be applied.

Furthermore, it is desirable to apply the form of comprising the barrier electrode shown in FIG. 20 even in the case of comprising the CF arrays of the Bayer arrangement.

What is claimed is:

1. A solid-state image-taking element comprising:
    a plurality of photoelectric conversion elements two-dimensionally arranged;
    a first vertical transfer route for transferring signal charges stored on the photoelectric conversion elements vertically downward along the row direction of the arrangement;
    a second vertical transfer route for transferring the signal charges stored on the photoelectric conversion elements vertically upward along the row direction of the arrangement;
    a vertical transfer control device which controls a vertical transfer of the signal charges on the first and second vertical transfer routes with a vertical transfer control signal;
    a first horizontal transfer route, provided below the first vertical transfer route, for transferring the signal charges sent from the first vertical transfer route in a horizontal direction along the line direction of the arrangement;
    a second horizontal transfer route, provided above the second vertical transfer routes, for transferring the signal charges sent from the second vertical transfer route in the horizontal direction along the line direction of the arrangement; and
    a charge-sending control electrode for controlling timing for sending the signal charges from each vertical transfer route to the second horizontal transfer routes in a second connection portion connecting the second horizontal transfer route with the second vertical transfer route,
    wherein said plurality of photoelectric conversion elements comprises:
        a first readout gate for reading the signal charges to one of the adjacent first and second vertical transfer routes;
        a second readout gate for reading the signal charges to the vertical transfer route other than the one for reading the signal charges from the first readout gate; and
        a readout control device which controls whether to read the signal charges from the first readout gate or to read the signal charges from the second readout gate, and
    wherein the vertical transfer control device uses the charge-sending control electrode to control sending of the signal charges from the second vertical transfer route to the second horizontal transfer route in different timing from sending of the signal charges from the first vertical transfer route to the first horizontal transfer route.

2. The solid-state image-taking element according to claim 1, wherein the photoelectric conversion element row is alternately placed with the first and second vertical transfer routes, and one of the vertical transfer routes placed adjacently to the photoelectric conversion elements is the first vertical transfer route and the other is the second vertical transfer route, and
    wherein the readout control device exerts control to read the signal charges from the first readout gate to one of the first and second vertical transfer routes and read the signal charges from the second readout gate to the vertical transfer route other than the one to which the signal charges are read via the first readout gate.

3. The solid-state image-taking element according to claim 1, further comprising:

a wiring device which has a structure for replacing adjacent two wirings out of the wirings of transfer electrodes to which the vertical transfer control signal is applied between the first and second vertical transfer routes, wherein the vertical transfer control device exerts control on the first vertical transfer route to transfer the signal charges to the first horizontal transfer route, and on the second vertical transfer route to transfer the signal charges to the second horizontal transfer route with a common vertical transfer control signal.

4. The solid-state image-taking element according to claim 1, wherein the photoelectric conversion elements are arranged in an arrangement of a honeycomb structure in which central points of geometrical forms of the photoelectric conversion elements are arranged by being alternately displaced by a half of an arrangement pitch in the line direction and in the row direction.

5. An image-taking apparatus comprising:

a plurality of photoelectric conversion elements two-dimensionally arranged;

a first vertical transfer route for transferring signal charges stored on the photoelectric conversion elements vertically downward along the row direction of the arrangement;

a second vertical transfer route for transferring the signal charges stored on the photoelectric conversion elements vertically upward along the row direction of the arrangement;

a vertical transfer control device which controls a transfer of the signal charges on the first and second vertical transfer route;

a first horizontal transfer route, provided below the first vertical transfer route, for transferring the signal charges sent from the first vertical transfer route in a horizontal direction along the line direction of the arrangement;

a second horizontal transfer route, provided above the second vertical transfer route, for transferring the signal charges sent from the second vertical transfer route in the horizontal direction along the line direction of the arrangement;

a charge-sending control electrode for controlling timing for sending the signal charges from each vertical transfer route to the second horizontal transfer routes in a second connection portion connecting the second horizontal transfer route with the second vertical transfer route;

a first output portion for outputting as image-taking signals the signal charges horizontally transferred on the first horizontal transfer route; and a second output portion for outputting as the image-taking signals the signal charges horizontally transferred on the second horizontal transfer route, the photoelectric conversion elements comprising a solid-state image-taking element comprising:

a first readout gate for reading the signal charges to one of the adjacent first and second vertical transfer routes;

a second readout gate for reading the signal charges to the vertical transfer route other than the one for reading the signal charges from the first readout gate; and a readout control device which controls whether to read the signal charges from the first readout gate or to read the signal charges from the second readout gate;

a vertical transfer control device which controls vertical transfer of signal charges in the first vertical transfer route and the second vertical transfer route with a vertical transfer control signal, and which uses the charge-sending control electrode to control sending of the signal charges from the second vertical transfer route to the second horizontal transfer route in different timing from sending of the signal charges from the first vertical transfer route to the first horizontal transfer route; and an output switching device which exerts control by switching between obtaining the image-taking signals from the first output portion and obtaining the image-taking signals from the second output portion.

6. The image-taking apparatus according to claim 5, wherein, when shooting a moving image, the output switching device exerts control to obtain the image-taking signals from one of the first output portion and the second output portion.

7. The image-taking apparatus according to claim 5, wherein, when shooting a static image, the output switching device exerts control to transfer the signal charges to the first output portion and the second output portion.

8. The image-taking apparatus according to claim 5, further comprising:

color filter arrays including a color filter array having color filters corresponding to R, G and B arranged according to a predetermined arrangement and also having at least a row in which filters corresponding to G are placed along a row direction and a row in which elements corresponding to R and the elements corresponding to B are alternately placed along the row direction, where the rows are alternately placed along the line direction, wherein, when shooting a static image, the vertical transfer control device exerts control to transfer the signal charges corresponding to a color G to one of the first and second horizontal transfer devices and transfer the signal charges corresponding to R and B to the horizontal transfer device other than the one to which the signal charges corresponding to the color G are transferred.

* * * * *